United States Patent
Ishidate et al.

(10) Patent No.: US 10,303,080 B2
(45) Date of Patent: May 28, 2019

(54) IMAGE FORMING APPARATUS WITH IMPROVED TIMING FOR EMITTING BEAM DETECT LIGHT BEAM

(71) Applicant: CANON KABUSHIKI KAISHA, Tokyo (JP)

(72) Inventors: Takehiro Ishidate, Tokyo (JP); Yuichiro Imai, Tokyo (JP); Yasuaki Otoguro, Abiko (JP); Hirotaka Seki, Tokyo (JP); Kazumi Sato, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/119,673

(22) PCT Filed: Apr. 14, 2015

(86) PCT No.: PCT/JP2015/061924
§ 371 (c)(1),
(2) Date: Aug. 17, 2016

(87) PCT Pub. No.: WO2015/159992
PCT Pub. Date: Oct. 22, 2015

(65) Prior Publication Data
US 2017/0010558 A1 Jan. 12, 2017

(30) Foreign Application Priority Data
Apr. 15, 2014 (JP) ................................. 2014-083559

(51) Int. Cl.
*G03G 15/043* (2006.01)
*B41J 2/47* (2006.01)
(Continued)

(52) U.S. Cl.
CPC .............. *G03G 15/043* (2013.01); *B41J 2/47* (2013.01); *G02B 5/09* (2013.01); *G02B 26/121* (2013.01);
(Continued)

(58) Field of Classification Search
CPC .... G03G 15/043; G03G 21/14; G02B 26/129; G02B 5/09; G02B 26/121; B41J 2/47; H04N 1/113
See application file for complete search history.

(56) References Cited

U.S. PATENT DOCUMENTS 5,883,659 A * 3/1999 Serizawa ................. B41J 2/471
347/260
7,522,326 B1 4/2009 Otoguro ........................ 347/256
(Continued)

FOREIGN PATENT DOCUMENTS

| JP | 2003-285468 | 10/2003 |
|---|---|---|
| JP | 3694164 | 9/2005 |

(Continued)

OTHER PUBLICATIONS

International Preliminary Report on Patentability from corresponding PCT Application No. PCT/JP2015/061924, dated Oct. 27, 2016.
(Continued)

*Primary Examiner* — David M. Gray
*Assistant Examiner* — Laura Roth
(74) *Attorney, Agent, or Firm* — Venable LLP

(57) ABSTRACT

An image forming apparatus includes: a photosensitive member; a process member configured to act on the photosensitive member; and a light scanning apparatus configured to emit a light beam to the photosensitive member. The light scanning apparatus includes: a light source; a rotary polygon mirror; a first signal generating unit configured to receive the light beam deflected by the rotary polygon mirror to gener-
(Continued)

ate a first signal indicating a scan starting position; and a second signal generating unit configured to generate a second signal based on a rotation angle of the rotary polygon mirror. A lighting-up timing of the light source for generating the first signal is determined based on a number of the second signals after a voltage for image formation is applied and a relationship between the first signal and the second signal is obtained before the voltage is applied and after the rotary polygon mirror is rotated.

4 Claims, 19 Drawing Sheets

(51) Int. Cl.
   *G02B 5/09* (2006.01)
   *G02B 26/12* (2006.01)
   *G03G 21/14* (2006.01)
   *H04N 1/113* (2006.01)
(52) U.S. Cl.
   CPC ........... *G02B 26/129* (2013.01); *G03G 21/14* (2013.01); *H04N 1/113* (2013.01)

(56) References Cited

U.S. PATENT DOCUMENTS

| | | | |
|---|---|---|---|
| 7,684,099 B2 | 3/2010 | Otoguro | 359/216.1 |
| 8,547,412 B2 | 10/2013 | Ito | 347/261 |
| 8,947,478 B2 | 2/2015 | Ishidate et al. | 347/137 |
| 9,086,645 B2 | 7/2015 | Otoguro et al. | G02B 26/125 |
| 9,195,063 B2 | 11/2015 | Ishidate et al. | G03G 15/04072 |
| 9,316,992 B2 | 4/2016 | Ishidate et al. | G03G 21/1666 |
| 9,400,444 B2 | 7/2016 | Sato et al. | G02B 26/121 |
| 2008/0285104 A1* | 11/2008 | Arai | B41J 2/471 359/205.1 |
| 2009/0324293 A1* | 12/2009 | Tomioka | B41J 2/473 399/221 |
| 2011/0243590 A1* | 10/2011 | Ito | G03G 15/0409 399/51 |
| 2012/0195610 A1 | 8/2012 | Fujishiro et al. | 399/51 |
| 2015/0042739 A1 | 2/2015 | Seki | 347/118 |
| 2015/0130884 A1* | 5/2015 | Kato | G03G 15/043 347/118 |
| 2015/0202886 A1 | 7/2015 | Aruga et al. | B41J 2/471 |
| 2015/0277082 A1 | 10/2015 | Otoguro et al. | G03G 15/0435 |
| 2015/0293350 A1* | 10/2015 | Sato | G03G 15/043 347/118 |
| 2016/0116858 A1 | 4/2016 | Sato | G03G 2215/0158 |
| 2016/0150113 A1 | 5/2016 | Sato et al. | G06K 15/406 |
| 2016/0207328 A1 | 7/2016 | Otoguro et al. | B41J 2/471 |
| 2016/0216632 A1 | 7/2016 | Ishidate et al. | G02B 26/127 |

FOREIGN PATENT DOCUMENTS

| | | | |
|---|---|---|---|
| JP | 2007-078723 | | 3/2007 |
| JP | 2007078723 A | * | 3/2007 |
| JP | 2011-209565 | | 10/2011 |

OTHER PUBLICATIONS

U.S. Appl. No. 15/160,270, filed May 20, 2016.
JP Office Action dated Jan. 8, 2019 in counterpart JP Application No. 2015-083020 with English translation.

* cited by examiner

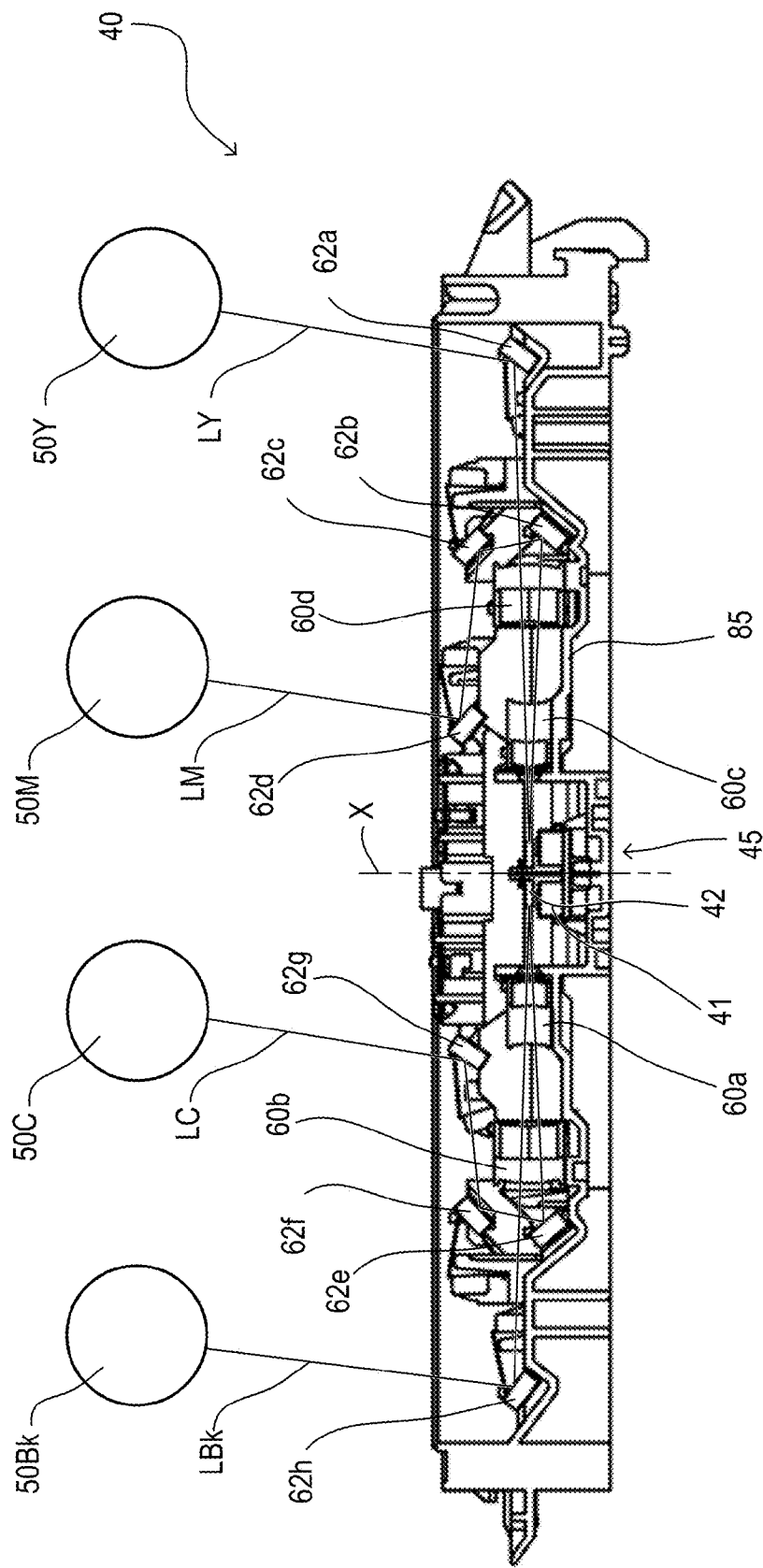

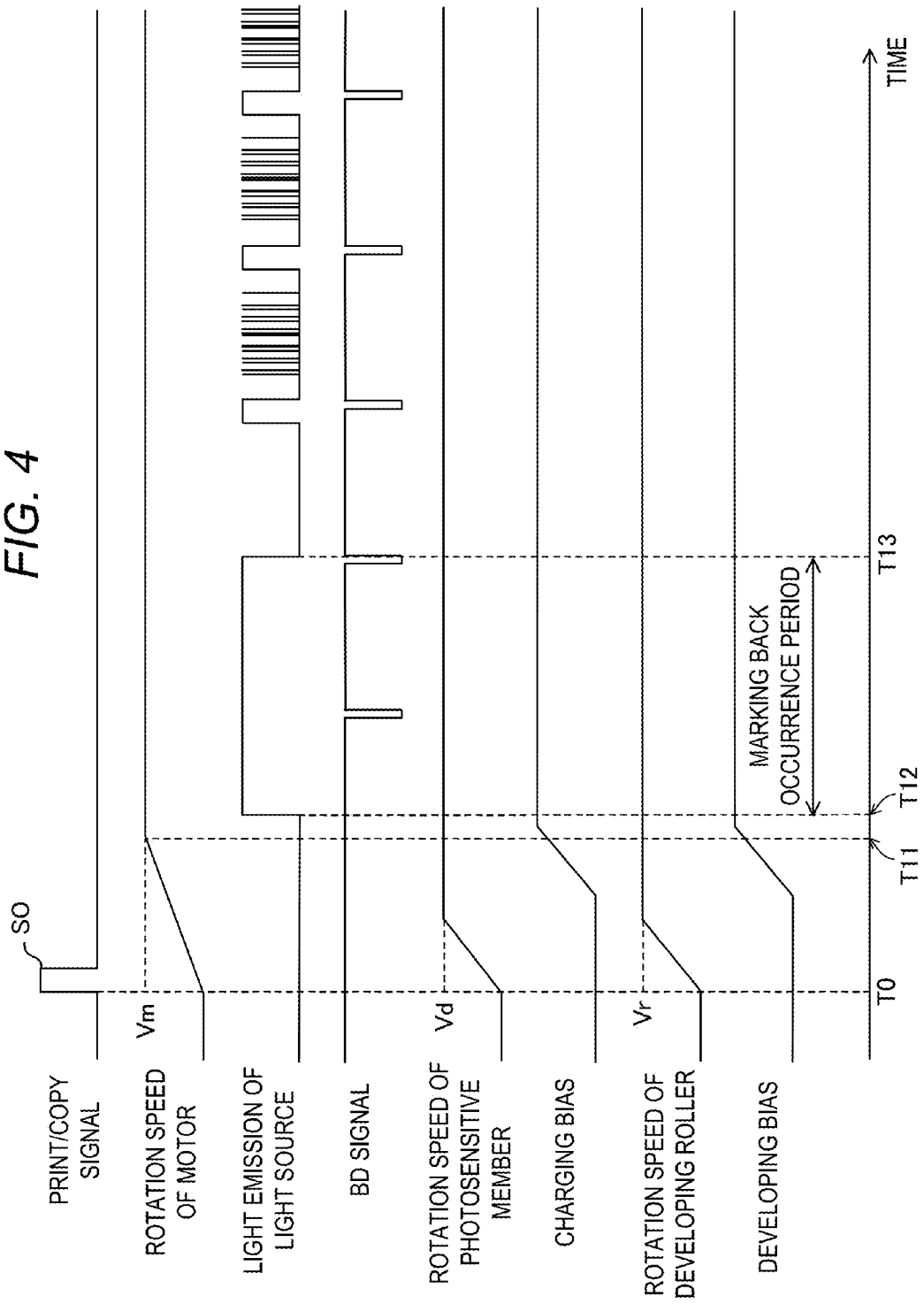

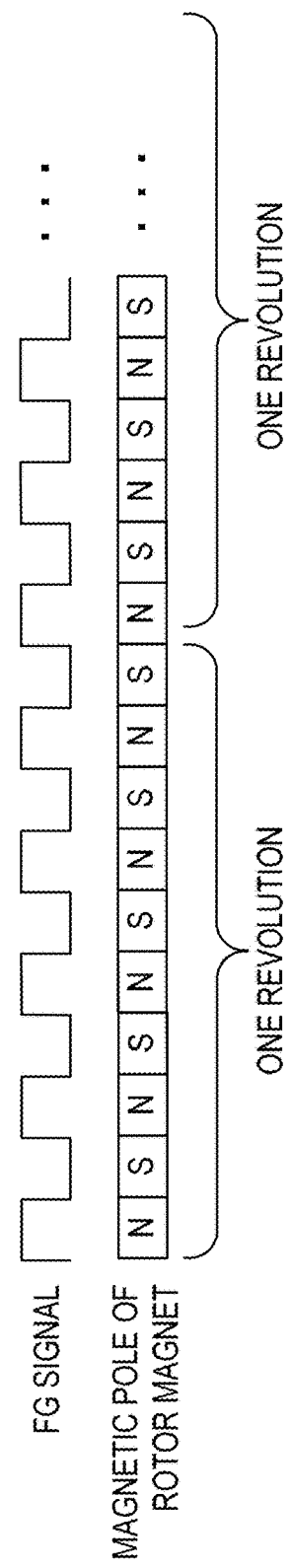

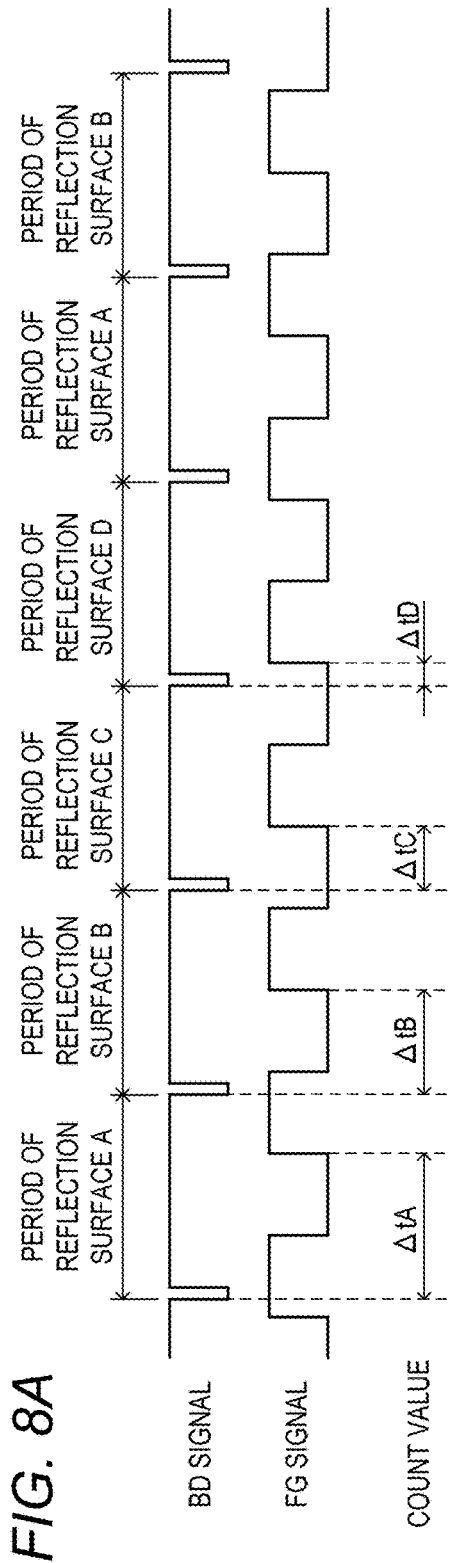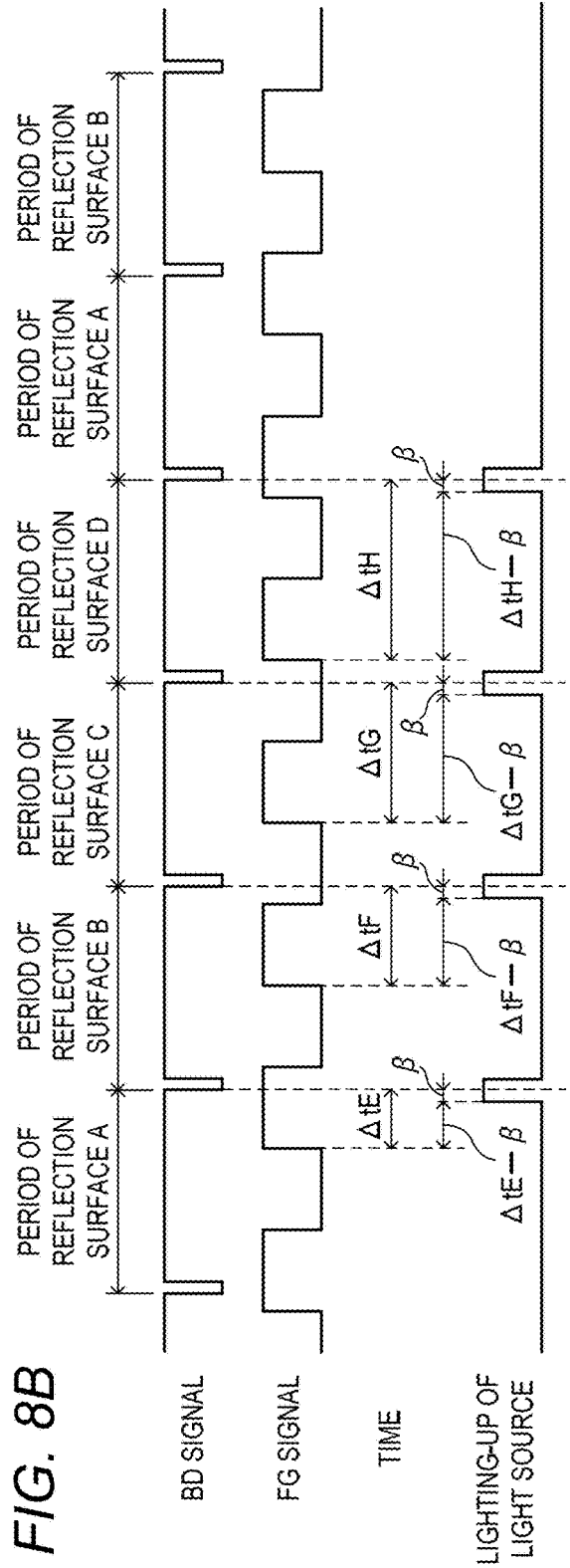

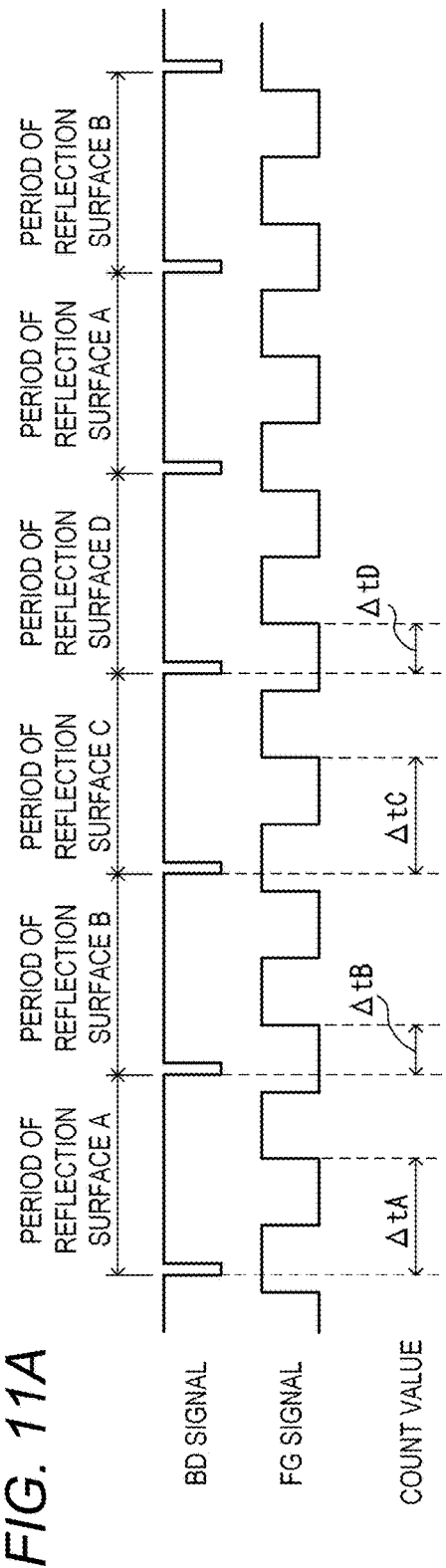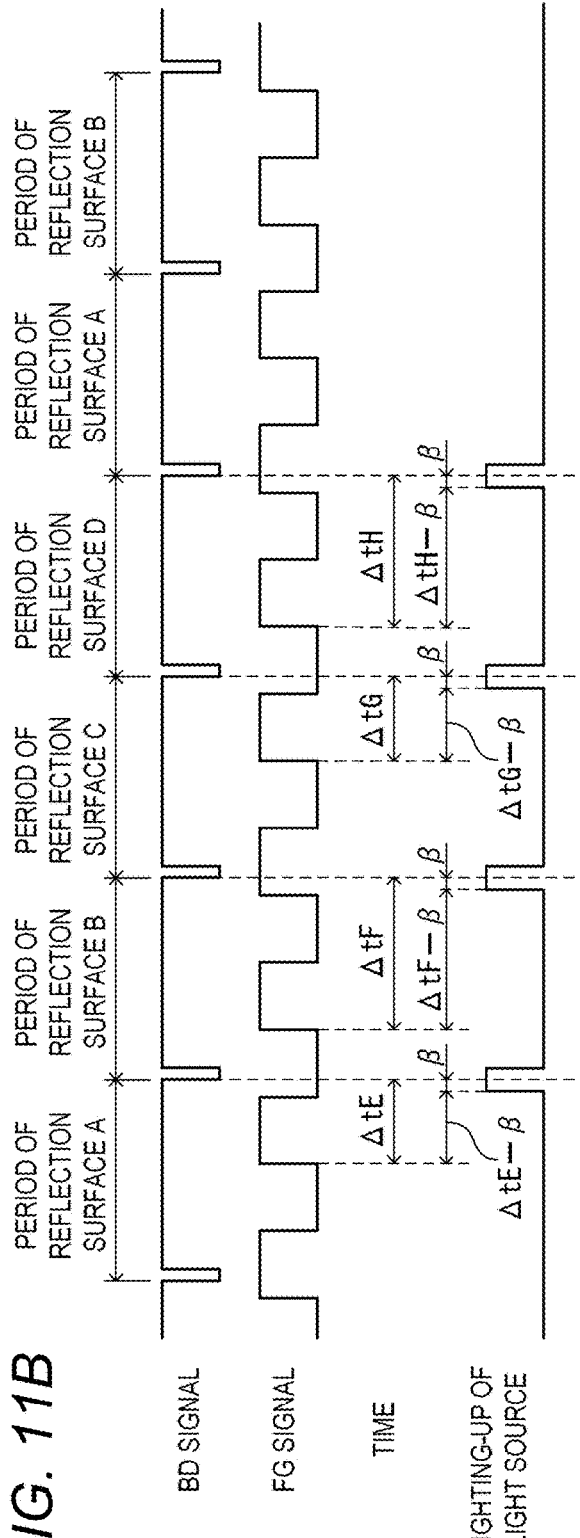

IMAGE FORMING APPARATUS WITH IMPROVED TIMING FOR EMITTING BEAM DETECT LIGHT BEAM

TECHNICAL FIELD

The present invention relates to an image forming apparatus including a light scanning apparatus.

BACKGROUND ART

Hitherto, an electrophotographic image forming apparatus such as a digital copying machine, a laser beam printer, or a facsimile apparatus includes a light scanning apparatus. The light scanning apparatus scans a surface of an electrophotographic photosensitive drum (hereinafter referred to as "photosensitive member") with a laser beam (hereinafter referred to as "light beam") modulated based on the image information, to thereby form an electrostatic latent image thereon. The electrostatic latent image is developed by a developing device into a toner image with toner. The toner image on the photosensitive member is transferred onto a recording medium by a transfer device. A fixing device fixes the toner image transferred onto the recording medium, to thereby form an image on the recording medium.

The light scanning apparatus includes a light source configured to emit a light beam and a rotary polygon mirror configured to deflect the light beam emitted from the light source so that the light beam scans a photosensitive member. The light scanning apparatus generates a synchronizing signal (hereinafter referred to as "BD signal") in a main-scanning direction in order to maintain the same image writing start position (scan starting position) on the photosensitive member during each scan. When the light beam enters a beam detector (hereinafter referred to as "BD"), the BD signal is output from the BD.

The light scanning apparatus starts to rotate the rotary polygon mirror before image formation, but it is unknown which timing the light beam is to be emitted at so that the light beam enters the BD. Therefore, in a state in which the rotary polygon mirror is stably rotated at a main rotation speed for image formation, the light source is kept on (laser full lighting-up) over a predetermined period of time. Then, the timing at which the light beam enters the BD is detected from the BD signal, and a timing to turn on the light source so that the light beam enters the BD is determined. This is referred to as "BD search (BD timing search)". When the BD search is completed, the image forming apparatus becomes ready to start the image formation.

In the BD search, the light source is kept on until at least the first BD signal is detected, and hence the photosensitive member is exposed to the light beam emitted from the light source during the time. The exposure of the photosensitive member in the BD search causes marking back to occur on the recording medium. Therefore, there is proposed a light scanning apparatus including a mark provided on a rotor configured to hold the rotary polygon mirror, and an optical sensor configured to irradiate the mark with light, detect light reflected therefrom, and output a position signal indicating a rotational position of the rotor (PTL 1). During pre-rotation processing at a time of warm-up before an image forming operation, the rotary polygon mirror is rotated at the main rotation speed, and a time difference between the position signal and the BD signal is obtained and stored in a memory. After that, the light source is turned off. By turning on the light source based on the time difference read from the memory immediately before the image formation, it is possible to determine a lighting-up timing of the light source for obtaining the BD signal without exposing the photosensitive member. Therefore, it is possible to prevent the marking back from occurring on the recording medium.

CITATION LIST

Patent Literature

PTL 1: Japanese Patent No. 3694164

SUMMARY OF INVENTION

However, according to PTL 1, the optical sensor needs to be separately provided in order to detect the mark provided on the rotor. This may raise a problem of making a structure of the light scanning apparatus more complex and increasing the number of parts thereof.

Therefore, the present invention provides a light scanning apparatus configured to determine a lighting-up timing of a light source for obtaining a synchronizing signal with a simple structure without causing marking back to occur on a recording medium.

In order to solve the above-mentioned problem, according to one embodiment of the present invention, there is provided an image forming apparatus, comprising:
a photosensitive member;
a process member configured to act on the photosensitive member; and
a light scanning apparatus configured to emit a light beam to the photosensitive member,
wherein the light scanning apparatus comprises:
a light source configured to emit the light beam;
a rotary polygon mirror comprising a plurality of reflection surfaces configured to deflect the light beam emitted from the light source so that the light beam scans the photosensitive member;
a first signal generating unit configured to receive the light beam deflected by each of the plurality of reflection surfaces, and generate a first signal indicating a scan starting position of the light beam on the photosensitive member; and
a second signal generating unit configured to generate a second signal based on a rotation angle of the rotary polygon mirror,
wherein a relationship between the first signal and the second signal is obtained before a voltage for image formation is applied to the process member and after the rotary polygon mirror is rotated, and
wherein a lighting-up timing of the light source for generating the first signal is determined based on the relationship between the first signal and the second signal and a number of the second signals after the voltage is applied to the process member.

Further features of the present invention will become apparent from the following description of exemplary embodiments with reference to the attached drawings.

BRIEF DESCRIPTION OF DRAWINGS

FIG. 3A is a vertical sectional view of a light scanning apparatus.

FIG. 4 is a timing chart of a BD search according to a comparative example.

FIG. 6C is a diagram illustrating a relationship between an arrangement of magnetic poles of a rotor magnet and an FG signal.

FIG. 8A is a timing chart illustrating a relationship between a BD signal and the FG signal at a preliminary rotation speed Vp according to the first embodiment.

FIG. 8B is a timing chart illustrating a relationship between the BD signal and the FG signal at a main rotation speed Vm according to the first embodiment.

FIG. 11A is a timing chart illustrating a relationship between the BD signal and the FG signal at the preliminary rotation speed Vp according to a third embodiment.

FIG. 11B is a timing chart illustrating a relationship between the BD signal and the FG signal at the main rotation speed Vm according to the third embodiment.

DESCRIPTION OF EMBODIMENTS

Now, an embodiment for carrying out the present invention will be described.

First Embodiment (Image Forming Apparatus)

Figure 2:
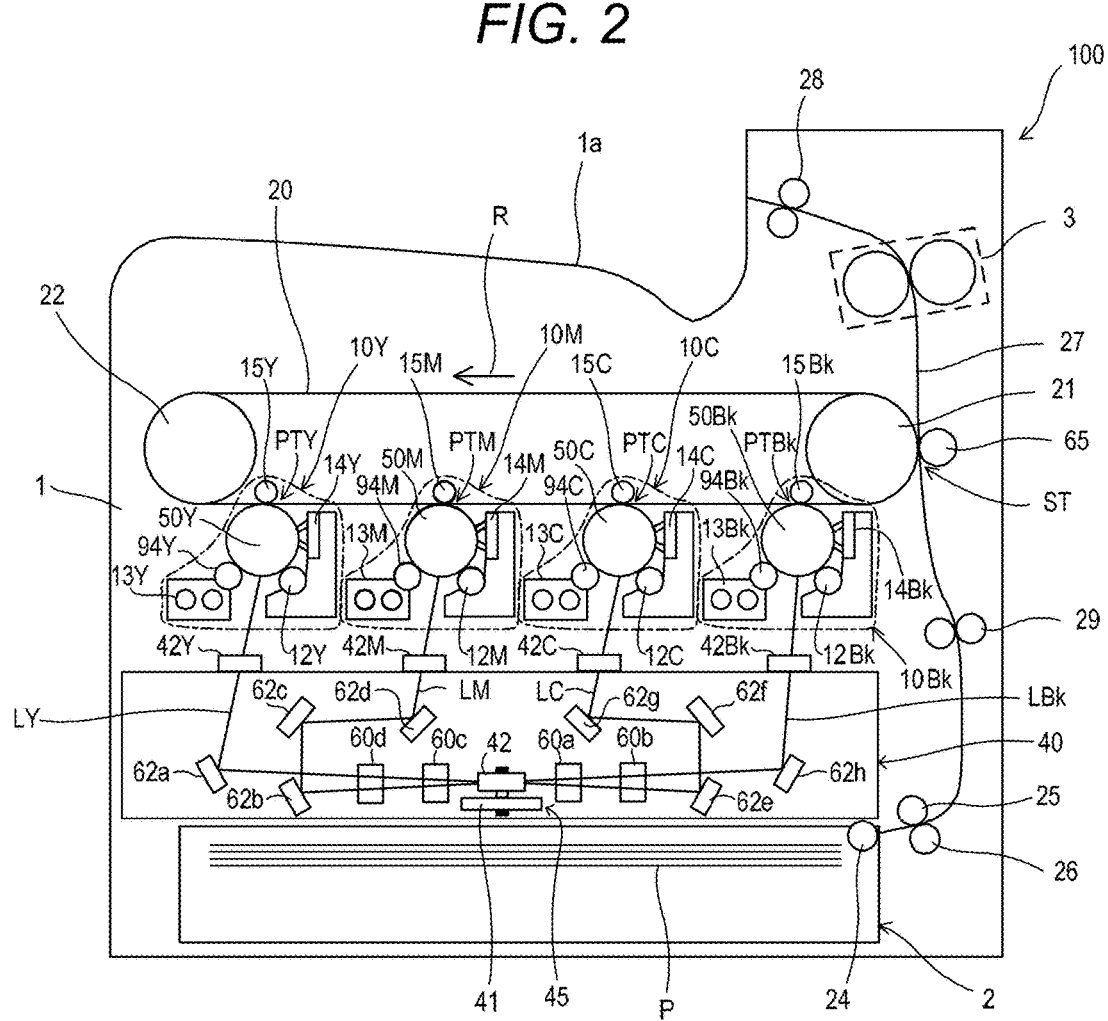
FIG. 2 is a sectional view of an image forming apparatus.

An electrophotographic image forming apparatus (hereinafter referred to as "image forming apparatus") 100 according to the present invention will be described. FIG. 2 is a sectional view of the image forming apparatus 100. As an example of the image forming apparatus 100, a tandem-type color laser beam printer is illustrated. The image forming apparatus 100 is configured to form an image on a recording medium (hereinafter referred to as "sheet") P using an electrophotographic method. The image forming apparatus 100 includes four image forming portions 10 (10Y, 10M, 10C, 10Bk). The suffixes Y, M, C, and Bk of the reference symbols indicate yellow, magenta, cyan, and black, respectively. In the following description, the suffixes Y, M, C, and Bk may be omitted.

The image forming portions 10 each include a photosensitive drum serving as an image bearing member (hereinafter referred to as "photosensitive member") 50 (50Y, 50M, 50C, 50Bk). A process member configured to act on the photosensitive member 50 is arranged around each of the photosensitive member 50. Specifically, a charging roller (charging device) 12 (12Y, 12M, 12C, 12Bk), a developing device 13 (13Y, 13M, 13C, 13Bk), and a primary transfer roller (primary transfer member) 15 (15Y, 15M, 15C, 15Bk) are arranged around the photosensitive member 50. A light scanning apparatus (exposure apparatus) 40 is arranged below the four image forming portions 10.

The charging roller (charging member) 12 is applied with a charging bias, to thereby uniformly charge a surface of the photosensitive member 50. The developing device 13 includes a developing roller (developer carrying unit) 94 (94Y, 94M, 94C, 94Bk) configured to carry developer (toner) of each color. The developing roller 94 is applied with a developing bias, to thereby develop an electrostatic latent image on the surface of the photosensitive member 50 with the toner to obtain a toner image.

The image forming apparatus 100 includes an intermediate transfer belt (intermediate transfer member) 20 onto which toner images of a plurality of colors are primarily transferred from the respective image forming portions 10. The intermediate transfer belt 20 is arranged above the four image forming portions 10. The intermediate transfer belt 20 is an endless belt that is stretched around a pair of belt conveyance rollers 21 and 22. The intermediate transfer belt 20 is rotated in a direction indicated by the arrow R.

The primary transfer roller 15 is arranged so as to face the photosensitive member 50 of the image forming portion 10 across the intermediate transfer belt 20. The primary transfer roller 15 forms a primary transfer portion PT (PTY, PTM, PTC, PTBk) between the intermediate transfer belt 20 and the photosensitive member 50. Through application of a transfer voltage to the primary transfer roller 15, the toner image on the photosensitive member 50 is primarily transferred onto the intermediate transfer belt 20.

The four image forming portions 10Y, 10M, 10C, and 10Bk are arranged in line below the intermediate transfer belt 20. Along the rotational direction R of the intermediate transfer belt 20, the yellow image forming portion 10Y, the magenta image forming portion 10M, the cyan image forming portion 10C, and the black image forming portion 10Bk are arranged in the stated order. The image forming portions 10 form a yellow toner image, a magenta toner image, a cyan toner image, and a black toner image with the toners of the respective colors.

A secondary transfer roller 65 is arranged so as to face the belt conveyance roller 21 across the intermediate transfer belt 20, to thereby form a secondary transfer portion ST between the intermediate transfer belt 20 and the secondary transfer roller 60.

A sheet feeding cassette 2 configured to receive the sheets P is provided at a lower portion of a main body 1 of the image forming apparatus 100. The sheet feeding cassette 2 is removably mounted to the lower portion of the main body 1 from a side surface of the main body 1. A pickup roller 24 and a feed roller 25 are provided above the sheet feeding cassette 2. The pickup roller 24 and the feed roller 25 are configured to feed the sheets P received in the sheet feeding cassette 2 one by one. A retard roller 26 is arranged so as to face the feed roller 25 in order to prevent multifeed of the sheets P.

A conveyance route 27 of the sheet P in an interior of the main body 1 is formed so as to be substantially vertical along a right side surface of the main body 1 illustrated in FIG. 2.

A registration roller pair 29, the secondary transfer portion ST, a fixing device 3, and a delivery roller 28 are provided in the conveyance route 27.

(Image Forming Process)

Now, an image forming process in the image forming apparatus 100 will be described. The charging roller 12 uniformly charges a surface of the photosensitive member 50. The light scanning apparatus 40 exposes the uniformly charged surface of the photosensitive member 50 to laser light (hereinafter referred to as "light beam") L (LY, LM, LC, LBk), which is modulated based on image information (image data) of each color. With this, an electrostatic latent image is formed on the surface of the photosensitive member 50. The developing device 13 develops the electrostatic latent image with the toner of each color, to thereby form the toner image of each color on the photosensitive member 50. The toner images of the four colors formed by the four image forming portions 10 are primarily transferred by the primary transfer rollers 15 onto the intermediate transfer belt 20 rotated in the rotational direction R, and are then superimposed on the intermediate transfer belt 20. The toner (transfer residual toner) remaining on the photosensitive member 50 after the primary transfer is collected by a cleaning device 14 (14Y, 14M, 14C, 14Bk).

On the other hand, the sheet P is fed to the registration roller pair 29 from the sheet feeding cassette 2 by the pickup roller 24 and the feed roller 25. The registration roller pair 29 conveys the sheet P to the secondary transfer portion ST between the secondary transfer roller 65 and the intermediate transfer belt 20 in synchronization with the toner images superimposed on the intermediate transfer belt 20.

The toner images superimposed on the intermediate transfer belt 20 are secondarily transferred onto the sheet P collectively in the secondary transfer portion ST. The toner remaining on the intermediate transfer belt 20 without being transferred onto the sheet P during the second transfer is collected by a cleaning mechanism (not shown) of the intermediate transfer belt 20. The sheet P having the toner image transferred thereon is conveyed to the fixing device 3 arranged upstream of the secondary transfer portion ST along the conveyance route 27.

The fixing device 3 heats and pressurizes the sheet P, to thereby fix the toner images onto the sheet P. In this manner, a full-color image is formed on the sheet P. The sheet P having the full-color image formed thereon is delivered onto a delivery tray 1a provided at an upper portion of the main body 1 by the delivery roller pair 28.

(Light Scanning Apparatus)

As described above, in a case of forming the full-color image by the image forming apparatus 100, the light scanning apparatus 40 is configured to expose the photosensitive members 50Y, 50M, 50C, and 50Bk of the respective image forming portions 10 to the light beams at respective predetermined timings based on the image information pieces of the respective colors. With this, the toner images of the respective colors are formed on the photosensitive members 50 based on the image information pieces of the respective colors. In order to obtain the full-color image with high quality, positions of the electrostatic latent images formed by the light scanning apparatus 40 need to be reproducibly aligned with high accuracy. In the embodiment, the light scanning apparatus 40 is shared by the four image forming portions 10Y, 10M, 10C, and 10Bk.

Figure 3B:
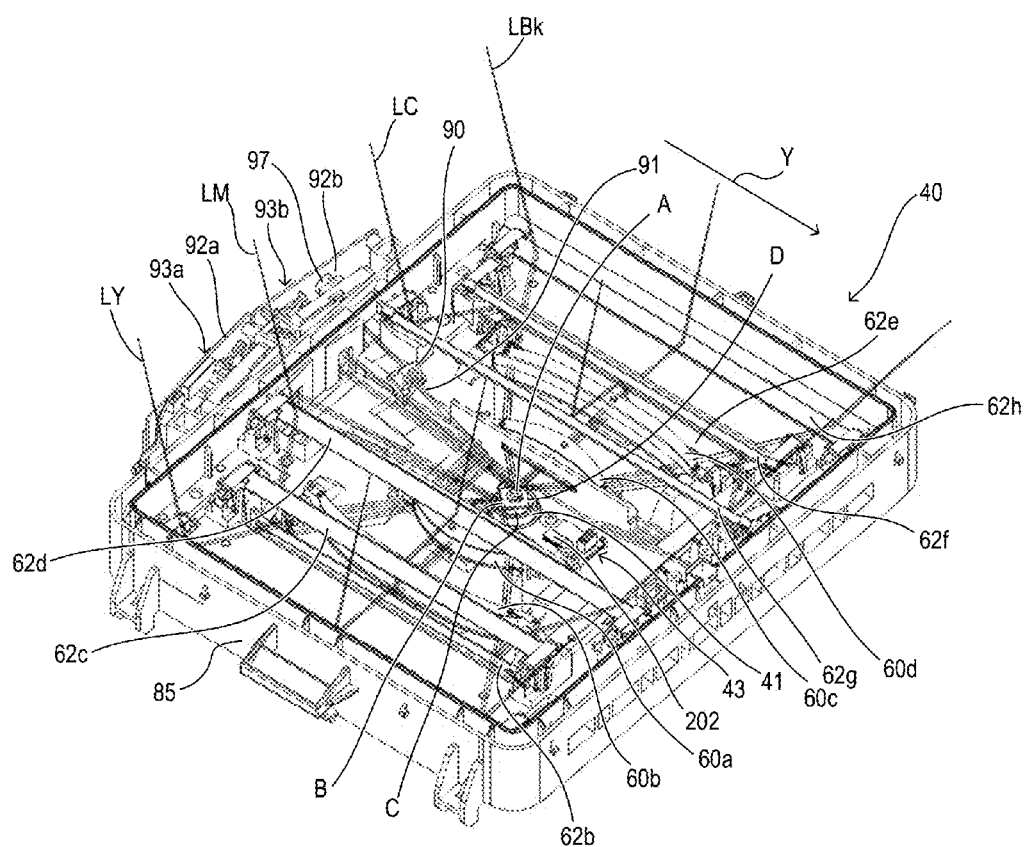
FIG. 3B is a perspective view of the light scanning apparatus when viewed from a side thereof opposite to a light source unit.
Figure 3C:
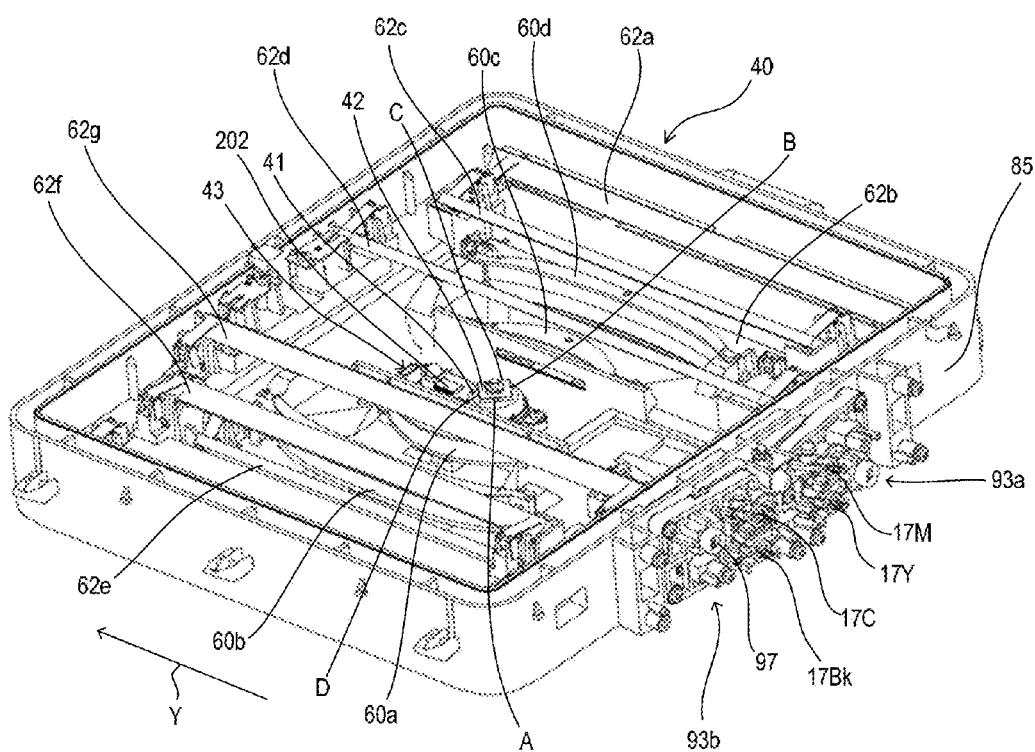
FIG. 3C is a perspective view of the light scanning apparatus when viewed from a side thereof on which the light source unit is provided.

FIG. 3A is a vertical sectional view of the light scanning apparatus 40. FIG. 3B is a perspective view of the light scanning apparatus 40 when viewed from a side thereof opposite to a light source unit 93 (93a, 93b). FIG. 3C is a perspective view of the light scanning apparatus 40 when viewed from a side thereof on which the light source unit 93 is provided. With reference to FIG. 2, FIG. 3A, FIG. 3B, and FIG. 3C, the light scanning apparatus 40 will be described below.

The light scanning apparatus 40 includes an optical box (hereinafter referred to as "housing") 85. The housing 85 includes the light source unit 93 (93a, 93b), a rotary polygon mirror 42, a lens 60 (60a, 60b, 60c, 60d), and a reflective mirror 62 (62a, 62b, 62c, 62d, 62e, 62f, 62g, 62h). The light scanning apparatus 40 includes four semiconductor lasers (hereinafter referred to as "light sources") 17 (17Y, 17M, 17C, 17Bk) each configured to emit a light beam modulated based on image information on each color. The light source unit 93a holds the light source 17Y configured to emit a light beam LY modulated based on the image information on yellow and the light source 17M configured to emit a light beam LM modulated based on the image information on magenta. The light source unit 93b holds the light source 17C configured to emit a light beam LC modulated based on the image information on cyan and the light source 17Bk configured to emit a light beam LBk modulated based on the image information on black.

The light scanning apparatus 40 includes a deflecting unit (deflector) 45 configured to deflect a light beam L in a central part of the housing 85. The deflecting unit 45 includes the rotary polygon mirror 42, a motor 41 configured to rotate the rotary polygon mirror 42, and a circuit board 43 configured to drive the drive motor 41. The light beam L emitted from the light source 17 is emitted toward the rotary polygon mirror 42. The light beam L is deflected by the rotary polygon mirror 42 being rotated. The light beam L deflected by the rotary polygon mirror 42 is guided by optical members such as the lens 60 and the reflective mirror 62 installed inside the light scanning apparatus 40 so as to be introduced to the photosensitive member 50. The light beam L scans the surface of the photosensitive member 50 along a main-scanning direction (direction of a rotation axis of the photosensitive member 50) indicated by the arrow Y in FIG. 3B.

Now, an optical path of each of the light beams LBk, LC, LM, and LY will be described in detail. The light beam LY emitted from the light source 17Y corresponding to the photosensitive member 50Y is deflected by the rotary polygon mirror 42, and enters the lens 60c. The light beam LY that has passed through the lens 60c enters the lens 60d, passes through the lens 60d, and is then reflected by the reflective mirror 62a. The light beam LY reflected by the reflective mirror 62a passes through a transparent window 42Y, to thereby scan the photosensitive member 50Y.

The light beam LM emitted from the light source 17M corresponding to the photosensitive member 50M is deflected by the rotary polygon mirror 42, and enters the lens 60c. The light beam LM that has passed through the lens 60c enters the lens 60d, passes through the lens 60d, and is then reflected by the reflective mirror 62b, the reflective mirror 62c, and the reflective mirror 62d. The light beam LM reflected by the reflective mirror 62d passes through a transparent window 42M, to thereby scan the photosensitive member 50M.

The light beam LC emitted from the light source 17C corresponding to the photosensitive member 50C is deflected by the rotary polygon mirror 42, and enters the lens 60a. The light beam LC that has passed through the lens 60a enters the lens 60b, passes through the lens 60b, and is then reflected by the reflective mirror 62e, the reflective mirror 62f, and the reflective mirror 62g. The light beam LC reflected by the reflective mirror 62g passes through a transparent window 42C, to thereby scan the photosensitive member 50C.

The light beam LBk emitted from the light source 17Bk corresponding to the photosensitive member 50Bk is deflected by the rotary polygon mirror 42, and enters the lens 60a. The light beam LBk that has passed through the lens 60a enters the lens 60b, passes through the lens 60b, and is then reflected by the reflective mirror 62h. The light beam LBk reflected by the reflective mirror 62h passes through a transparent window 42Bk, to thereby scan the photosensitive member 50Bk.

(BD)

The light scanning apparatus 40 includes a beam detector (hereinafter referred to as "BD") 97 configured to generate a synchronizing signal (hereinafter referred to as "BD signal") in a main-scanning direction Y in order to maintain the same image writing start position on the photosensitive member 50 during each scan of the light beam L. The BD (first signal generating unit) 97 is provided on a light source control substrate 92b of the light source unit 93b. The BD 97 is arranged on an image writing side of the main-scanning direction Y of the light beam LBk. In the embodiment, the BD 97 receives the light beam LBk deflected by a reflection surface of the rotary polygon mirror 42, and generates a BD signal (first signal) indicating an image writing position in the main-scanning direction Y of the light beam LBk with respect to the photosensitive member 50. The light beam LBk deflected by the rotary polygon mirror 42 passes through an optical path 91 at an edge part of the image writing side in the main-scanning direction Y, and imaged on the BD 97 by a BD lens 90. When the light beam LBk passes over the BD 97, the BD signal is output from the BD 97. A CPU (control device) 600 described later determines, based on the BD signal, a timing when, in other words, a position (scan starting position) where the writing of the electrostatic latent image on the photosensitive member 50Bk is started by the light beam LBk for each reflection surface of the rotary polygon mirror 42. Therefore, at a time of image formation, the light source 17Bk needs to be turned on at a timing when the light beam LBk passes over the BD 97 for each scan.

Note that, the CPU 600 also determines timings when the image writing is started by the light beams LY, LM, and LC based on the BD signal of the light beam LBk. However, a BD may be provided to each of the light beams LY, LM, and LC. Alternatively, one BD may be provided to the light beams LY and LM, while another BD may be provided to the light beams LC and LBk.

(BD Search as Comparative Example)

In order to obtain the BD signal from the BD, the light beam L is emitted from the light source 17. However, unnecessary emission of the light beam L causes flare light to occur inside the light scanning apparatus 40. The flare light causes image degradation. Therefore, a lighting-up period of time during which the light source 17 is kept on in order to obtain the BD signal needs to be set as short as possible. In order to shorten the lighting-up period of time during which the light source 17 is kept on, it suffices that the light source 17 is turned on at a timing when the light beam L passes over the BD 97. To that end, it is necessary to know the timing when the light source 17 is turned on. Once the BD signal is obtained after the light beam L emitted from the light source 17 passes over the BD 97, a lighting-up timing of the light source 17 can be held as long as the motor 41 is steadily rotated with a constant speed. However, once the motor 41 is stopped, it is necessary to identify the lighting-up timing of the light source 17 again. A comparative example of the embodiment for identifying the lighting-up timing of the light source 17 for obtaining the BD signal will be described below.

In general, when the rotation of the stopped motor 41 is started, the image forming apparatus conducts a synchronization detection identifying sequence (hereinafter referred to as "BD search") in order to determine the lighting-up timing of the light beam L entering the BD 97. In the related-art BD search, first, the motor 41 is steadily rotated at a main rotation speed for image formation. The light source 17 is turned on in a state in which the motor 41 is being steadily rotated with the predetermined rotation speed, and is kept on until the BD signal is output from the BD 97. When the BD signal is detected, the light source 17 is turned off. The light source 17 is turned on after a predetermined time period has elapsed since the BD signal is detected, and when the BD signal is detected again, the light source 17 is turned off. The turning on and off of the light source 17 are controlled at such a timing, to thereby be able to obtain the BD signal for each scan.

The BD search is conducted, for example, before the image is written for the image formation on the first sheet during one job. The image writing start position in an axis direction (main-scanning direction Y) of the photosensitive drum 50 can be obtained from a rotational position of the rotary polygon mirror 42 at a time point when the BD signal is detected. For example, after the predetermined time period obtained in advance has elapsed since the BD signal is detected, when the emission of the light beam L modulated based on the image information is started, the same image writing start position on the photosensitive member 50 can be maintained during each scan. As long as the rotary polygon mirror 42 is being steadily rotated at the main rotation speed, it is possible to constantly grasp the rotational position of the rotary polygon mirror 42 based on the BD signal. By controlling a motor drive portion 202 based on the BD signal, it is possible to maintain the same image writing start position during each scan.

Incidentally, in the BD search according to the comparative example, the light beam is emitted while the light source 17 is kept on in order to obtain the first BD signal after rotation start of the motor 41, and hence the surface of the photosensitive member 50 is exposed to the light beam. Such exposure of the photosensitive member 50 causes degradation of the photosensitive member 50 and unnecessary formation of a toner image. The unnecessary formation of the toner image increases toner consumption. Further, the unnecessary formation of the toner image may cause marking back to occur on the sheet P. Now, an occurrence mechanism of the marking back due to the BD search according to the comparative example will be described.

(Marking-Back Occurrence Mechanism Due to BD Search According to Comparative Example)

Now, with reference to FIG. 4 and FIGS. 5A, 5B, 5C, 5D, 5E, and 5F, a marking-back occurrence mechanism for the sheet P due to the BD search according to the comparative example will be described. FIG. 4 is a timing chart of the BD search according to the comparative example. FIGS. 5A to 5F are schematic diagrams illustrating a process in which the marking back occurs.

In FIG. 4, the user generates a print/copy signal S0 that causes the image forming apparatus 100 to start printing or copying (time T0). When the rotation speed of the photosensitive member 50 reaches a predetermined rotation speed Vd for image formation, the charging bias is applied to the charging roller 12. Further, when a rotation speed of the developing roller 94 reaches a predetermined rotation speed Vr for image formation, the developing bias is applied to the developing roller 94. When a rotation speed of the motor 41 reaches a main rotation speed Vm of a rotation speed for optical writing (time T11), the photosensitive member 50 and the developing roller 94 are being stably rotated with the predetermined rotation speeds Vd and Vr, and the charging bias and the developing bias are applied thereto, respectively.

In the state in which the motor 41 is stably rotated at the main rotation speed Vm, the light source 17 is turned on (time T12). The light source 17 maintains its turned-on state until the BD signal is output from the BD 97. In this example, the turned-on state of the light source 17 is maintained until the BD signal has been output twice (time T13). In order to prevent erroneous detection due to noise or the like, it is general that the turned-on state of the light source 17 is maintained until the BD signal is output a plurality of times.

Here, a period during which the light source 17 is kept on from the time T12 to the time T13 illustrated in FIG. 4 corresponds to a marking-back occurrence period. During the marking-back occurrence period, the photosensitive member 50 and the developing roller 94 is being stably rotated with the predetermined rotation speeds Vd and Vr, and the charging bias and the developing bias are applied to the charging roller 12 and the developing roller 94, respectively. Accordingly, the surface of the rotated photosensitive member 50 is charged by the charging roller 12. The charged surface of the photosensitive member 50 is exposed to the light beam L from the light source 17 for the BD search, and the latent image is formed on the photosensitive member 50. The developing bias is applied to the developing roller 94 as well, and hence the latent image is developed by the developing device 13 into the toner image with the toner.

Figure 5A:
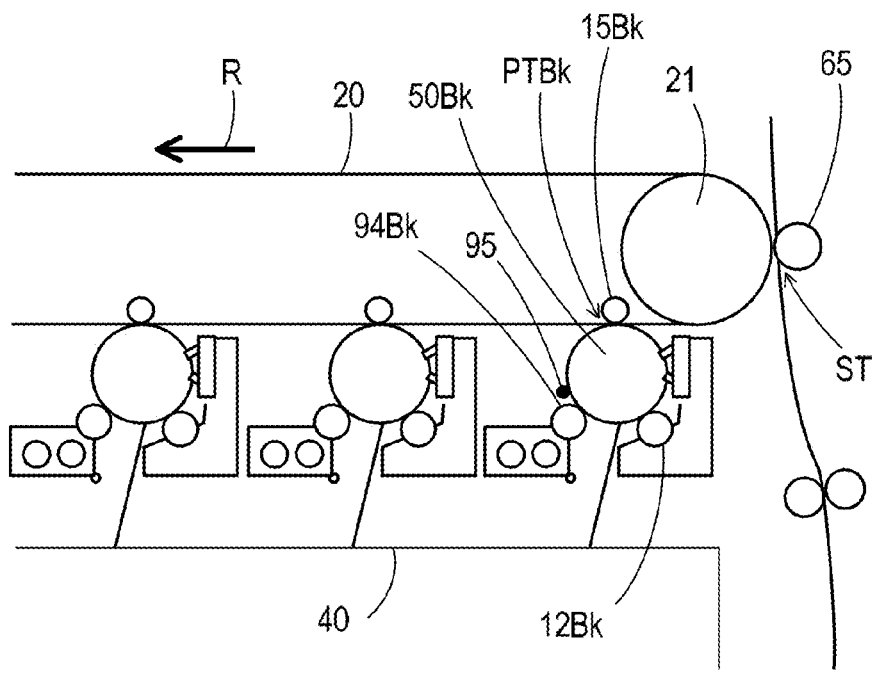
FIGS. 5A, 5B, 5C, 5D, 5E, and 5F are schematic diagrams illustrating a process in which marking back occurs.
Figure 5B:
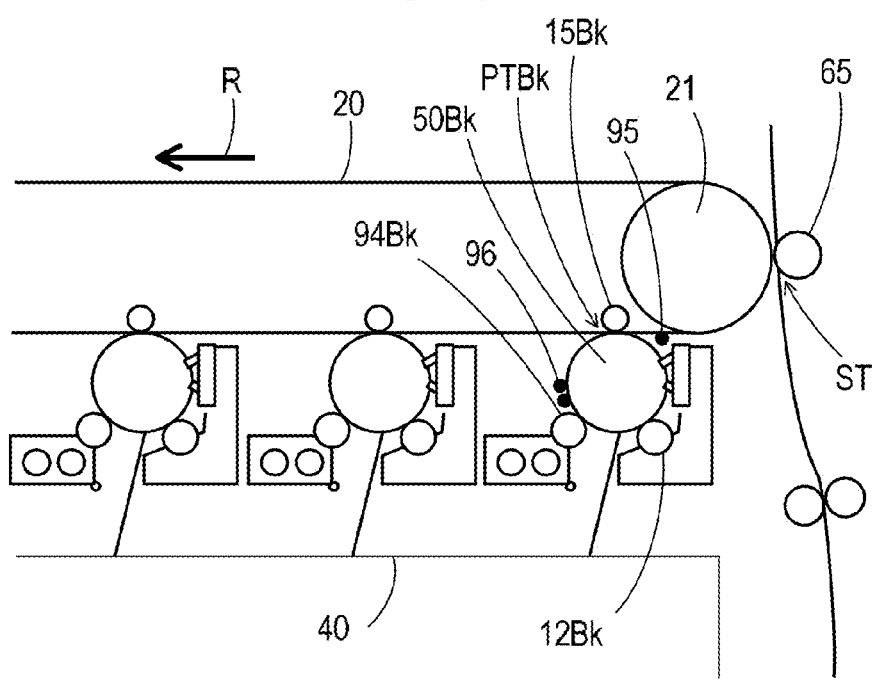
Figure 5C:
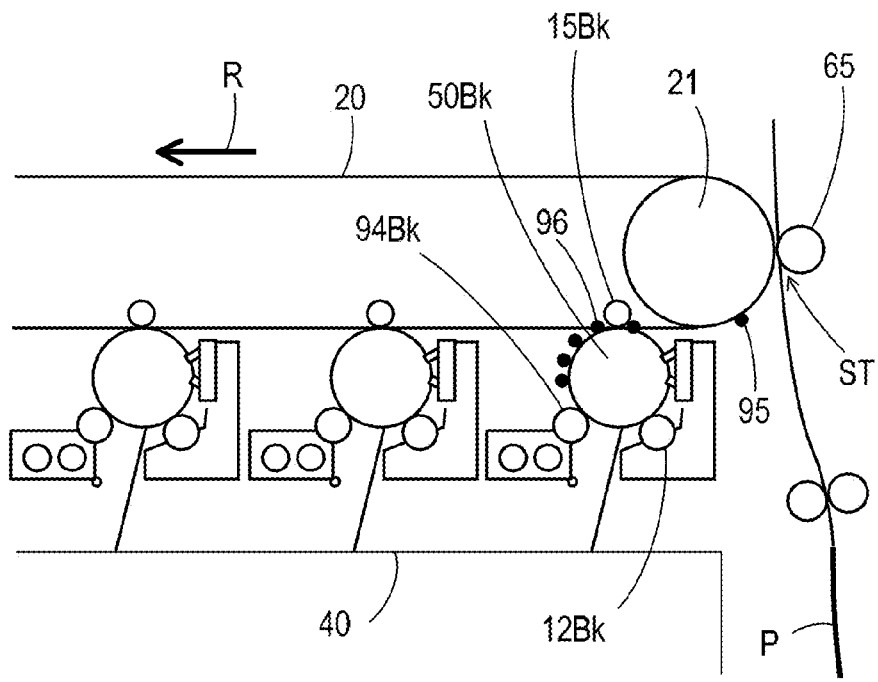
Figure 5D:
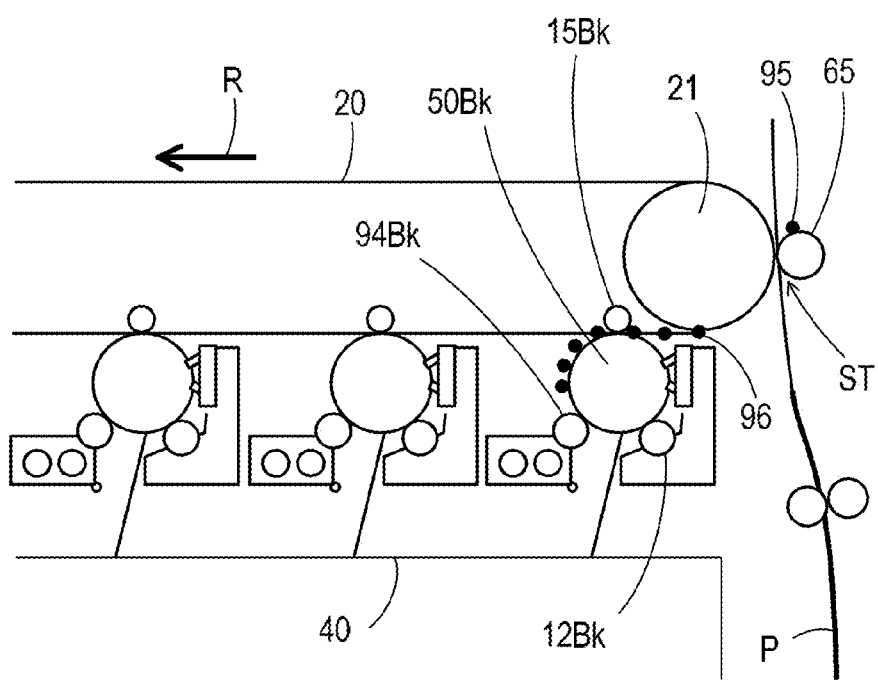
Figure 5E:
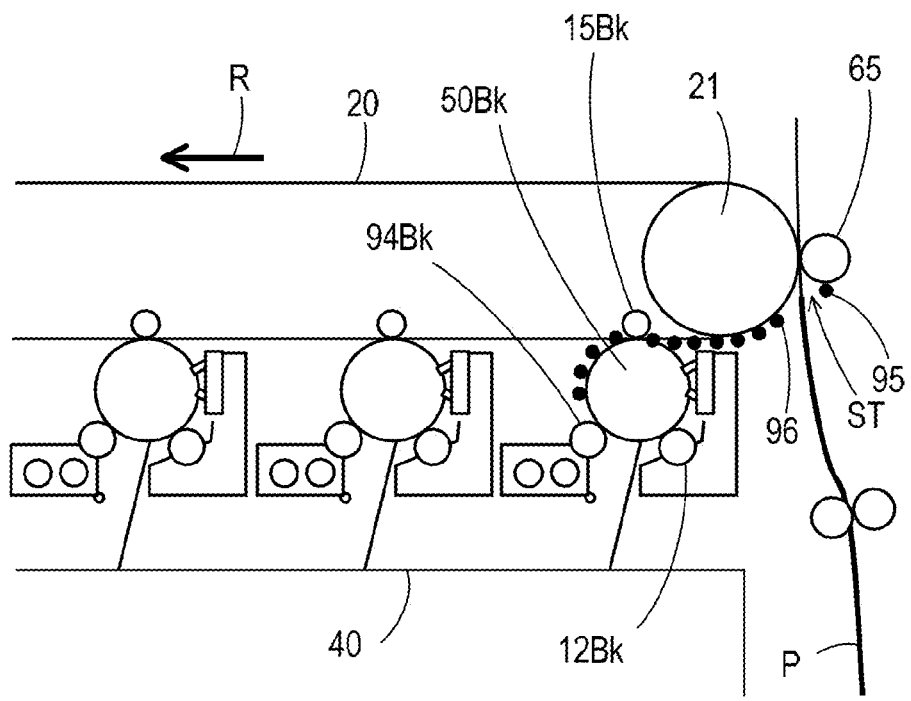
Figure 5F:
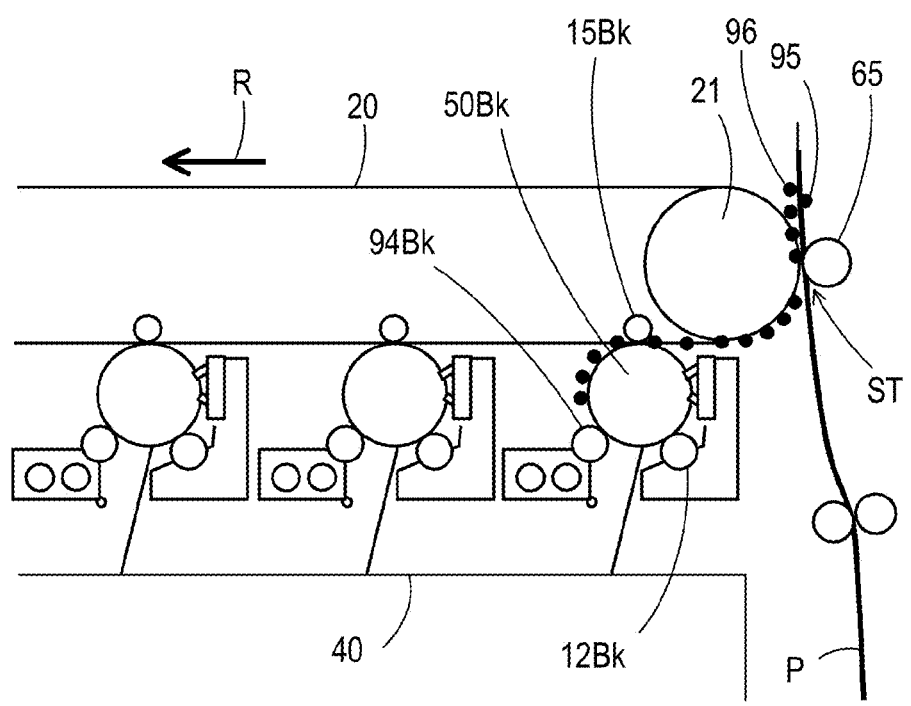

In particular, as in this example, when the light beam L reflected by the rotary polygon mirror 42 reaches the photosensitive member 50 a plurality of times to form a plurality of linear latent images extending in the main-scanning direction Y on the photosensitive member 50, the plurality of linear latent images are likely to be developed due to an edge effect or the like. FIG. 5A illustrates a state where, at this time, toner 95 adheres onto the photosensitive member 50Bk. The toner 95 (hereinafter referred to as "marking back toner") to become the marking back in the subsequent stage adheres onto the photosensitive member 50Bk. The marking back toner 95 on the photosensitive member 50Bk is carried to a primary transfer portion PTBk by the rotation of the photosensitive member 50Bk. A predetermined primary transfer bias is applied to the primary transfer roller 15Bk, and as illustrated in FIG. 5B, the marking back toner 95 on the photosensitive member 50Bk is transferred onto the intermediate transfer belt 20 by the primary transfer roller 15Bk. Here, on the photosensitive member 50Bk, a desired toner image 96 to be formed starts to be developed with the toner by the developing device 13. In addition, as illustrated in FIG. 5C, the marking back toner 95 on the intermediate transfer belt 20 is carried to the secondary transfer portion ST. A predetermined secondary transfer bias is applied to the secondary transfer roller 65, and hence, as illustrated in FIG. 5D, the marking back toner 95 on the intermediate transfer belt 20 is attracted directly to the secondary transfer roller 65, to thereby adhere thereto. As illustrated in FIG. 5E, the sheet P is conveyed to the secondary transfer portion ST in synchronization with the desired toner image 96 on the intermediate transfer belt 20. As illustrated in FIG. 5F, at the secondary transfer portion ST, the desired toner image 96 is transferred onto a front surface of the sheet P, while the marking back toner 95 on the secondary transfer roller 65 adheres to a back surface of the sheet P. In this manner, the marking back occurs on the sheet P during the general BD search.

When the marking back toner 95 adheres to the secondary transfer roller 65, in order to prevent the occurrence of the marking back on the sheet P, the secondary transfer roller 65 needs to be rotated at idle until an amount of the marking back toner is reduced so that no marking back occurs on the sheet P, and a time period (first copy output time) until the copy of the first sheet is output becomes long. Further, productivity of the image forming apparatus 100 greatly depends on how the first copy output time is shortened. In order to shorten the first copy output time, the writing of the desired image 96 is started immediately after the BD search has been completed. Therefore, as illustrated in FIGS. 5A to 5F, the marking back toner 95 and the desired image 96 are arranged in extremely close positions. For that reason, it is difficult to prevent the marking back toner 95 from entering the subsequent stage by switching the respective kinds of bias between the marking back toner 95 and the desired image 96.

Further, in order to prevent the marking back toner 95 from adhering to the photosensitive member 50 even when the photosensitive member 50 is exposed during the BD search, it is conceivable to delay the application of the charging bias to the charging roller 12 and the application of the developing bias to the developing device 13. However, to pursue the shortening of the first copy output time, a time period from the rotation start of the motor 41 to the start of the image formation needs to be set as short as possible. In that case, the application of the charging bias to the charging roller 12 and the application of the developing bias to the developing device 13 need to be started substantially simultaneously with the rotation start of the motor 41. For that reason, the marking back toner 95 adheres to the photosensitive member 50, to thereby cause the marking back to occur on the sheet P.

Therefore, in the embodiment, the BD search for preventing the marking back from occurring on the sheet P is executed. Now, a configuration for executing the BD search according to the embodiment will be described.

(Motor)

Figure 6A:
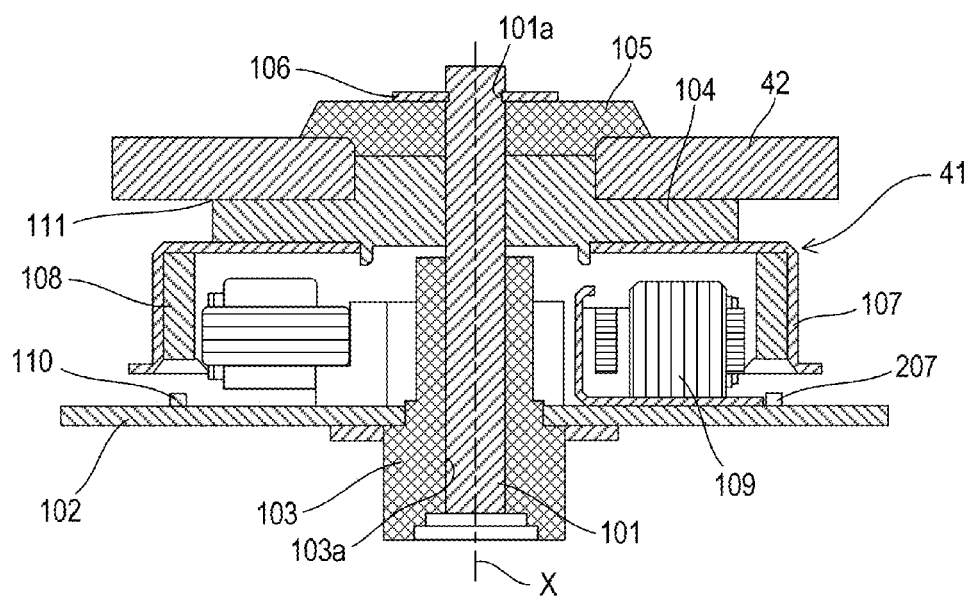
FIG. 6A is a sectional view of a motor configured to rotate a rotary polygon mirror.
Figure 6B:
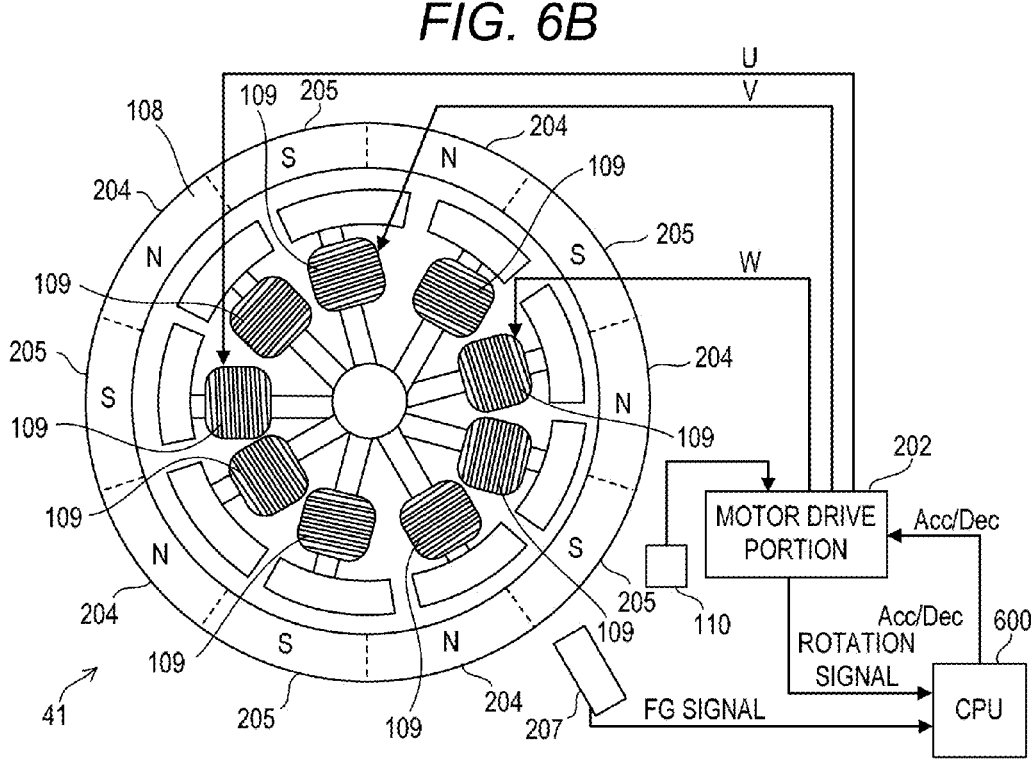
FIG. 6B is a circuit diagram of the motor.

FIG. 6A is a sectional view of the motor 41 configured to rotate the rotary polygon mirror 42. FIG. 6B is a circuit diagram of the motor 41. FIG. 6C is a diagram illustrating a relationship between an arrangement of magnetic poles of a rotor magnet 108 and an FG signal.

As illustrated in FIG. 6A, the motor 41 includes a rotation shaft 101, a bearing 103, a rotor magnet (rotor) 108, a stator coil (stator) 109, a Hall IC (rotation phase detecting portion) 110, and a frequency generator (hereinafter referred to as "FG") 207. The FG functions as a speed detecting portion for detecting the rotation speed of the rotary polygon mirror 42. A substrate 102 is fixed to the housing 85 of the light scanning apparatus 40. The bearing 103 is fixed to the substrate 102 by caulking or the like. The rotation shaft 101 is inserted into an inner diameter hole 103a of the bearing 103 so as to be rotatably supported by the bearing 103.

A rotor boss 104 is fixed to the rotation shaft 101. The rotor boss 104 includes a bearing surface portion 111. The rotary polygon mirror 42 is arranged on the rotor boss 104 with a lower surface of the rotary polygon mirror 42 held in contact with the bearing surface portion 111 of the rotor boss 104. A presser plate 105 is arranged on an upper surface of the rotary polygon mirror 42 so as to be held in contact therewith. A grip ring 106 is arranged on the presser plate 105 to be engaged with an annular groove 101a of the rotation shaft 101. The rotary polygon mirror 42 is sandwiched between the rotor boss 104 and the presser plate 105 to be fixed to the rotor boss 104, in other words, the rotation shaft 101, by the grip ring 106.

A rotor frame 107 is fixed to a lower portion of the rotor boss 104. The rotor frame 107 has a cup shape obtained by drawing using a mold. The rotor magnet 108 is fixed to an inner periphery of the rotor frame 107. The rotor frame 107 is formed of a thin iron plate that allows high-precision drawing. The rotor magnet 108 is formed of a magnet made of rubber. The stator coil 109 is fixed onto the substrate 102. The stator coil 109 is arranged inside the rotor frame 107 so as to be opposed to the rotor magnet 108 in a direction orthogonal to an axis X of the rotation shaft 101.

The Hall IC 110 including the Hall element is arranged on the substrate 102. The Hall IC 110 is arranged so as to be opposed to the rotor magnet 108 in a direction parallel with the axis X of the rotation shaft 101. The FG 207 is arranged on the substrate 102. The FG 207 is arranged so as to be opposed to the rotor magnet 108 in a direction parallel with the axis X of the rotation shaft 101.

The rotary polygon mirror 42 is held by the rotation shaft 101 integrally with the rotor frame 107, the rotor magnet 108, the rotor boss 104, the presser plate 105, and the grip ring 106. The rotary polygon mirror 42 is rotated and stopped integrally with the rotor frame 107, the rotor magnet 108, the rotor boss 104, the presser plate 105, the grip ring 106, and the rotation shaft 101.

As illustrated in FIG. 6B, the motor 41 is electrically connected to the motor drive portion 202. The motor drive portion 202 is electrically connected to the CPU 600, the Hall IC 110, and the FG 207. The rotor magnet 108 of the motor 41 has a plurality of magnetic poles (S-pole and N-pole). In the embodiment, the rotor magnet 108 has five N-poles 204 and five S-poles 205. The rotor magnet 108 is an annular magnet in which the N-poles and the S-poles are magnetized alternately. Nine stator coils 109 are formed of coils U, coils V, and coils W. The Hall IC 110 outputs the voltage that changes in accordance with the rotation of the rotor magnet 108.

The motor drive portion 202 and the CPU 600 conducts rotation speed control of the motor 41. The motor drive portion 202 rotates the motor 41 by detecting the position of the rotor magnet 108 based on a change in the voltage output from the Hall IC 110 and switching a current flowing into the coils U, the coils V, and the coils W of the stator coil 109. The motor drive portion 202 controls the rotation speed of the motor 41 by changing the voltage applied to the stator coil 109 in accordance with an Acc/Dec signal (acceleration/deceleration signal) of the CPU 600. The CPU 600 detects the rotation speed of the motor 41 being actually rotated by using the FG signal (second signal) output from the FG (second signal generating unit) 207. Alternatively, the CPU 600 may detect the rotation speed of the motor 41 being actually rotated by using a rotation signal obtained by the motor drive portion 202 based on a signal (second signal) output from the Hall IC (second signal generating unit) 110. The CPU 600 outputs the Acc/Dec signal to the motor drive portion 202 so that the rotation speed of the motor 41 becomes the target rotation speed (preliminary rotation speed Vp and main rotation speed Vm), to thereby control the rotation speed of the motor 41.

The FG 207 generates an FG signal in accordance with a rotation phase of the rotary polygon mirror 42 so that a plurality of FG signals are generated at regular time intervals (at the same fixed interval of time) while the rotary polygon mirror 42 rotates one revolution. In other words, the FG 207 generates the FG signal when the rotary polygon mirror 42 is rotated by a predetermined rotation angle relative to a virtual reference position of the rotary polygon mirror 42. As illustrated in FIG. 6C, the number of pulses of the FG signal generated during one revolution of the motor 41 is determined depending on the numbers of N-poles and S-poles of the rotor magnet 108. In the embodiment illustrated in FIG. 6C, the rotor magnet 108 has five pairs of the N-pole and the S-pole, and hence the number of pulses of the FG signal generated during one revolution of the motor 41 is five.

The Hall IC 110 may also be configured to generate a signal in accordance with the rotation angle of the rotary polygon mirror 42 so that a plurality of signals are generated at regular time intervals (at the same fixed interval of time) while the rotary polygon mirror 42 rotates one revolution.

(Outline of Identification of Reflection Surface Candidate (Reflection Surface into which Light Beam Enters) of Rotary Polygon Mirror)

In the embodiment, the lighting-up timing of the light source 17 for obtaining the BD signal is determined by conducting identification of a reflection surface candidate of the rotary polygon mirror 42 and a BD area light emission search. First, a method of identifying the reflection surface candidate into which the light beam for obtaining the BD signal enters among a plurality of reflection surfaces of the rotary polygon mirror 42 will be described.

Figure 7:
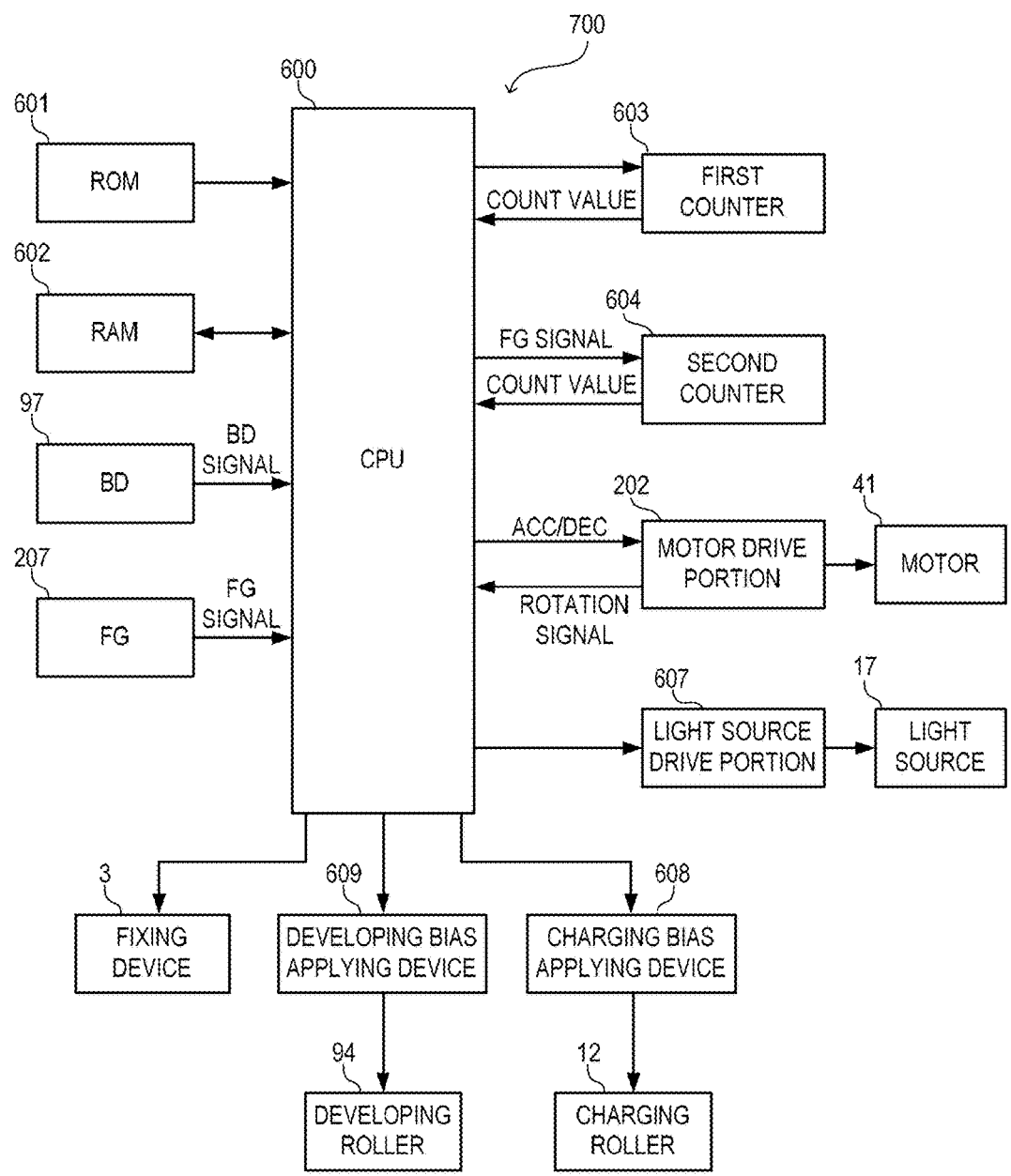
FIG. 7 is a block diagram of a control portion according to the first embodiment.

FIG. 7 is a block diagram of a control portion 700 according to the first embodiment. FIG. 8A is a timing chart illustrating a relationship between the BD signal and the FG signal at a preliminary rotation speed Vp according to the first embodiment. With reference to FIG. 7 and FIG. 8A, the identification of reflection surfaces A, B, C, and D of the rotary polygon mirror 42 will be described.

As illustrated in FIG. 7, the control portion 700 includes the CPU (control device) 600, a ROM 601, a RAM 602, a first counter 603, a second counter 604, the BD 97, the FG 207, the motor drive portion 202, and a light source drive portion 607. In addition, the control portion 700 includes a charging bias applying device (voltage applying device) 608 configured to apply the charging bias (voltage) for image formation to the charging roller (process member) 12. Further, the control portion 700 includes a developing bias applying device (voltage applying device) 609 configured to apply the developing bias (voltage) for image formation to the developing roller (process member) 94 of the developing device 13. The CPU 600 is electrically connected to the ROM 601, the RAM 602, the first counter 603, the second counter 604, the BD 97, the FG 207, the motor drive portion 202, the light source drive portion 607, the charging bias applying device 608, and the developing bias applying device 609.

The light source drive portion 607 is provided to the light source control substrate 92 (92a, 92b) of the light scanning apparatus 40. The motor drive portion 202 is provided to the circuit board 43. The CPU 600 controls the light source drive portion 607 and the motor drive portion 202. Further, the CPU 600 controls a temperature of the fixing device 3, the developing bias to be applied to the developing roller 94 of the developing device 13, and the charging bias to be applied to the charging roller 12.

In the embodiment, the rotary polygon mirror 42 includes the four reflection surfaces A, B, C, and D (FIG. 3B). While the rotary polygon mirror 42 rotates one revolution, the light beam L is reflected by the four reflection surfaces A, B, C, and D to enter the BD 97, and hence the BD 97 outputs four BD signals while the rotary polygon mirror 42 rotates one revolution. The FG 207 outputs five FG signals while the rotary polygon mirror 42 rotates one revolution. The four reflection surfaces of the rotary polygon mirror 42 are arranged substantially between the adjacent BD signals. In other words, there exist a reflection surface from which one FG signal is output between the BD signals and a reflection surface from which two FG signals are output between the BD signals while the rotary polygon mirror 42 rotates one revolution. In the embodiment, as illustrated in FIG. 8A, one FG signal is output during each period between the BD signals corresponding to the reflection surfaces A, B, and C, and two FG signals are output during the period between the BD signals corresponding to the reflection surface D.

The first counter 603 counts a time period between the BD signal output from the BD 97 and the FG signal output from the FG 207 after the BD signal, and outputs a count value (time interval) $\Delta t$ to the CPU 600. FIG. 8A illustrates count values $\Delta tA$, $\Delta tB$, $\Delta tC$, and $\Delta tD$ corresponding to the reflection surfaces A, B, C, and D. When the speed of the motor 41 becomes a constant rotation speed, a magnitude relation occurs among the count values $\Delta tA$, $\Delta tB$, $\Delta tC$, and $\Delta tD$. In other words, a relationship of $\Delta tA > \Delta tB > \Delta tC > \Delta tD$ occurs while the motor 41 rotates one revolution. The magnitude relation ($\Delta tA > \Delta tB > \Delta tC > \Delta tD$) among the count values $\Delta tA$, $\Delta tB$, $\Delta tC$, and $\Delta tD$ from the BD signal to the FG signal regarding the four reflection surfaces A, B, C, and D of the rotary polygon mirror 42 is stored in advance in the ROM (storage device) 601.

In the state in which the motor 41 is stably rotated with the constant rotation speed, the first counter 603 generates the four count values $\Delta t$ during one revolution of the rotary polygon mirror 42, and outputs the four count values $\Delta t$ to the CPU 600. The CPU 600 compares the magnitude relation among the four count values $\Delta t$ output from the first counter 603 with the magnitude relation in the count value (time interval) $\Delta t$ between the BD signal and the FG signal regarding the respective reflection surfaces A, B, C, and D of the rotary polygon mirror 42, which is stored in advance in the ROM 601. Based on the comparison result, the CPU 600 identifies which of the reflection surfaces A, B, C, and D of the rotary polygon mirror 42 each of the four count values $\Delta t$ output from the first counter 603 corresponds to. For example, it can be identified that the largest count value $\Delta t$ of the four count values $\Delta t$ corresponds to the reflection surface A of the rotary polygon mirror 42.

The method of identifying the reflection surface candidate of the rotary polygon mirror 42 into which the light beam for obtaining the BD signal enters according to the embodiment is described above.

Figure 12:
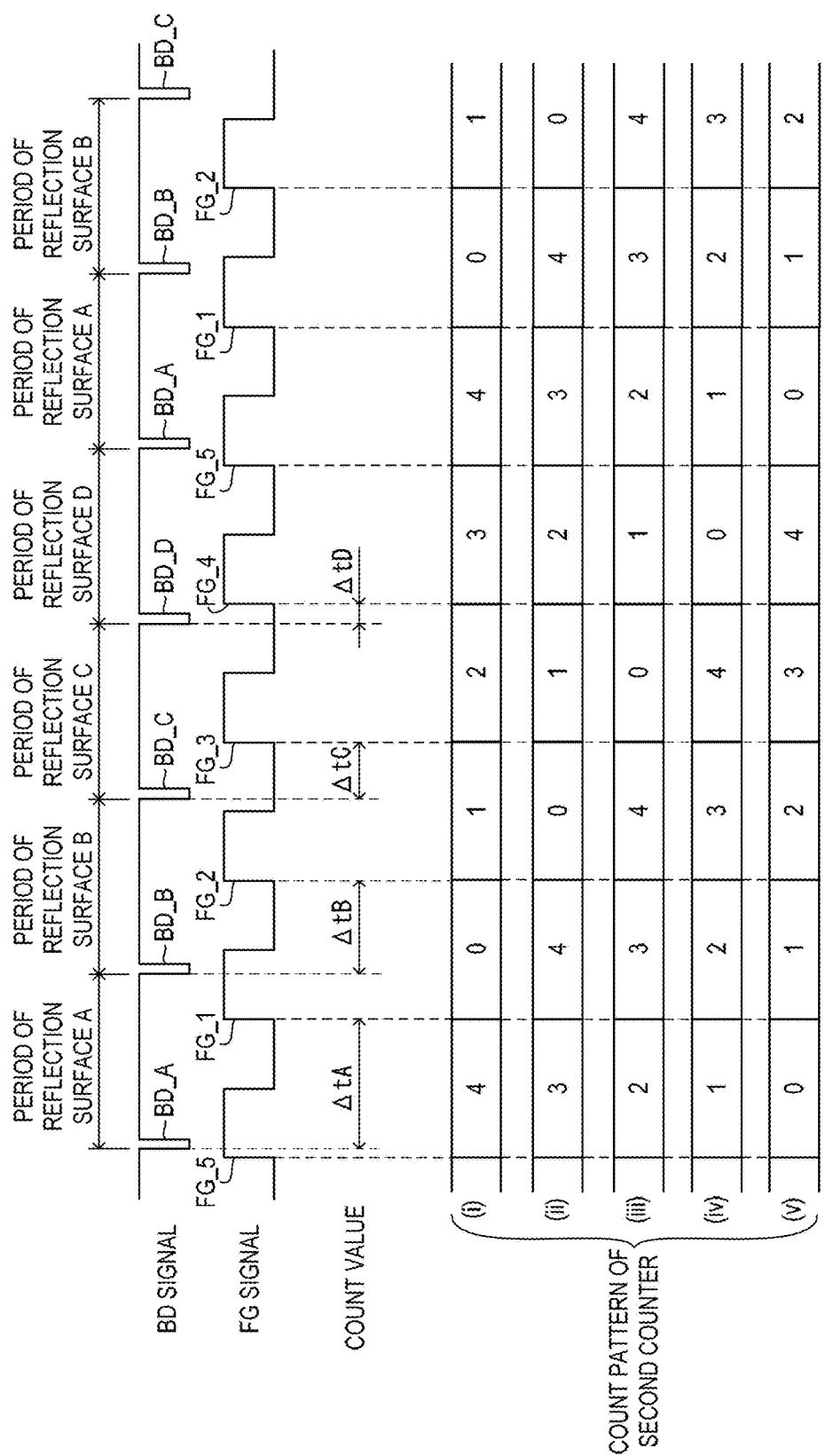
FIG. 12 is a diagram illustrating a relationship between generation timings of the BD signal and the FG signal and a count value of a second counter.

The second counter 604 counts the FG signal output from the FG 207 of the motor 41. This count is conducted in order to maintain reflection surface candidate identification information on the rotary polygon mirror 42 determined from the magnitude relation among the count values $\Delta t$ of the first counter 603 and the magnitude relation among the count values $\Delta t$ stored in the ROM 601. FIG. 12 is a diagram illustrating a relationship between generation timings of the BD signal and the FG signal and a count value of the second counter. For the sake of brevity of description, as illustrated in FIG. 12, the plurality of BD signals are represented by symbols BD_A, BD_B, BD_C, and BD_D. Further, as illustrated in FIG. 12, the plurality of FG signals are represented by symbols FG_1, FG_2, FG_3, FG_4, and FG_5. Note that, those symbols are not results of identifying orders of the BD signals and the FG signals by the CPU 600, but are defined merely for the sake of convenience.

The second counter 604 is reset each time the five FG signals are counted. In other words, the count value of the second counter 604 includes five kinds of values, namely, "0", "1", "2", "3", and "4". A count start point of the second counter 604 may be any FG signal of the five FG signals. Accordingly, the count pattern of the second counter 604 during the rotation of the rotary polygon mirror is any one of patterns indicated by (i) to (v) in FIG. 12.

The CPU 600 associates the count value of the first counter 603 with the count value of the second counter 604. For example, when the second counter 604 indicates the count pattern indicated by (v), the CPU 600 associates FG_1 with the count value "1", and the subsequent FG_2, FG_3, FG_4, and FG_5 with the count values "2", "3", "4", and "0", respectively. As described above, the ROM 601 stores phase information indicating the phase relation between the FG signal and the BD signal. For example, the phase information includes information on a generation timing difference ($\Delta tE-\beta$) between FG_1 and BD_B illustrated in FIG. 8B obtained in a case where the light beam is kept on in a state in which the rotary polygon mirror 42 is rotated with the above-mentioned predetermined rotation speed. The phase information includes information on the generation timing difference ($\Delta tF-\beta$) between FG_2 and BD_C, information on the generation timing difference ($\Delta tG-\beta$) between FG_3 and BD_D, and information on the generation timing difference ($\Delta tH-\beta$) between FG_4 and BD_A. The phase information may include information on a generation timing difference between FG_5 and BD_A instead of information on a generation timing difference between FG_4 and BD_A. The light beam is emitted based on the generation timing difference between each FG signal and the BD signal corresponding to the each FG signal, to thereby be able to identify an emitting timing of the light beam to the BD for generating BD_B, BD_C, BD_D, and BD_A without exposing the photosensitive member. In other words, the light beam is emitted at a timing slightly earlier than a timing obtained by adding the generation timing difference between each FG signal and the BD signal corresponding to the each FG signal to the generation timing of the FG signal, to thereby allow the light beam to scan the surface of the BD 97.

(Outline of BD Area Light Emission Search)

Next, the BD area light emission search for determining the lighting-up timing of the light source by causing the light beam for obtaining the BD signal to enter the identified reflection surface candidate will be described.

FIG. 8B is a timing chart illustrating a relationship between the BD signal and the FG signal at a main rotation speed Vm. The magnitude relation in the count value $\Delta t$ does not change depending on the rotation speed of the motor 41, but the count value changes depending on the rotation speed of the motor 41 because the count value $\Delta t$ itself is a value depending on time. Therefore, a time period $\Delta t$ from the FG signal to the BD signal at the main rotation speed Vm is obtained in advance and stored in the ROM 601. As illustrated in FIG. 8B, a time period $\Delta tE$ is a time period from the FG signal within a period corresponding to the reflection surface A to the BD signal for the reflection surface B. A time period $\Delta tF$ is a time period from the FG signal within a period corresponding to the reflection surface B to the BD signal for the reflection surface C. A time period $\Delta tG$ is a time period from the FG signal within a period corresponding to the reflection surface C to the BD signal for the reflection surface D. A time period $\Delta tH$ is a time period from the FG signal (in the embodiment, first FG signal) within a period corresponding to the reflection surface D to the BD signal for the reflection surface A.

The time periods ΔtE, ΔtF, ΔtG, and ΔtH are stored in the ROM 601 as the phase difference information (phase difference data) indicating the phase relation between the BD signal and the FG signal output while the rotary polygon mirror 42 rotates one revolution. The rotary polygon mirror 42 is fixed onto the motor 41 by being pressed thereon by the presser plate 105. The rotary polygon mirror 42 is rotated integrally with the rotor magnet 108, and hence the phase relation between the BD signal and the FG signal output while the rotary polygon mirror 42 rotates one revolution does not basically fluctuate during an operation thereof.

The BD area light emission search is executed by identifying the reflection surface candidate based on a count number of the FG signal obtained by the second counter (counting device) 604 and the reflection surface candidate identification information and controlling the turning on of the light source 17 based on the time period Δt corresponding to the identified reflection surface candidate.

Now, the identification of the reflection surface candidate of the rotary polygon mirror 42 and the BD area light emission search will be described in more detail in accordance with processing executed by the CPU 600.

(Outline of BD Search According to the Embodiment)

Figure 1:
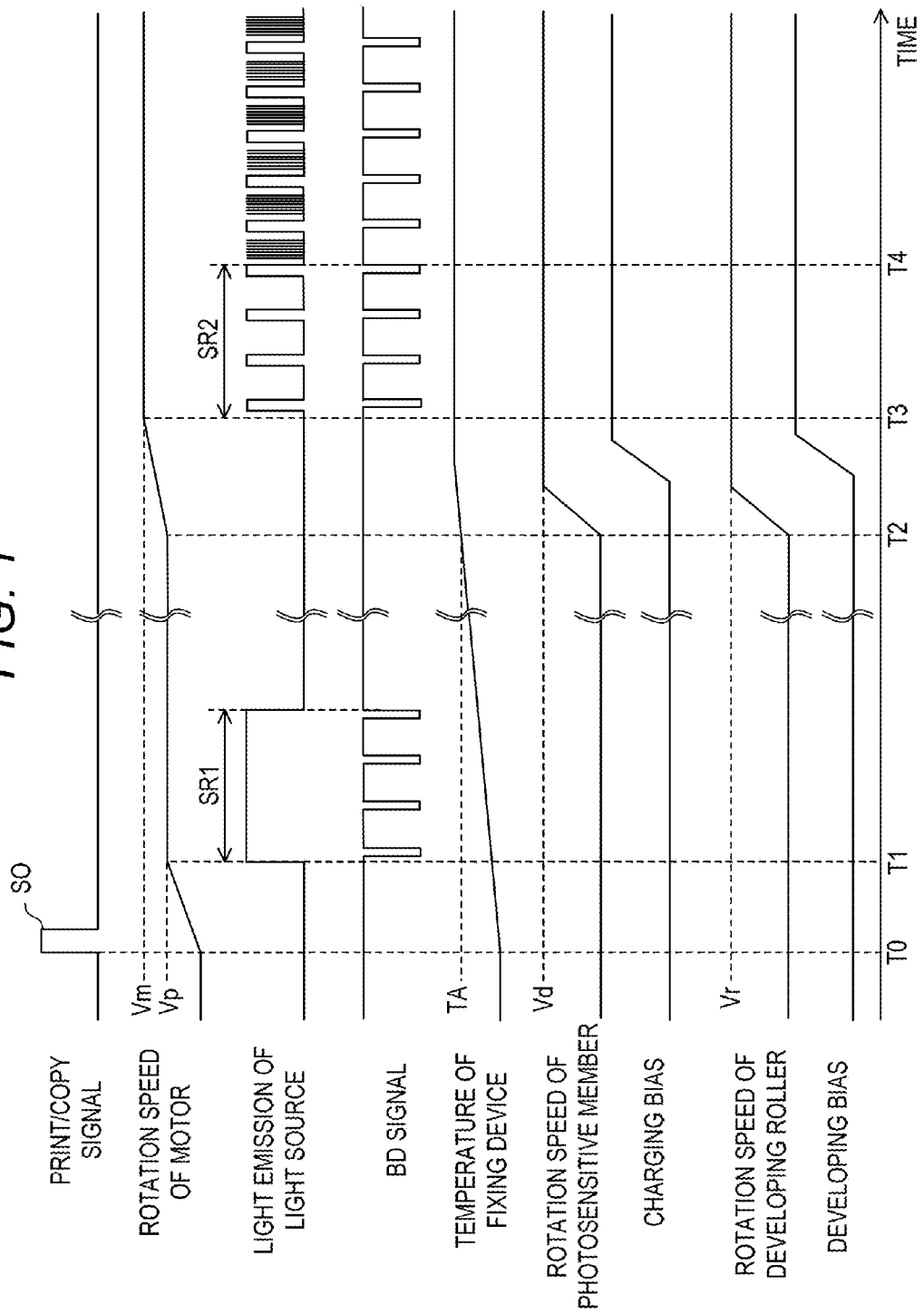
FIG. 1 is a timing chart of a BD search according to a first embodiment.

Next, with reference to FIG. 1, an outline of a BD search according to the embodiment will be described. FIG. 1 is a timing chart of the BD search according to the first embodiment.

In FIG. 1, when a user issues an instruction to start print or copy from an operation portion (not shown) of the image forming apparatus 100 or an external device (not shown) to the image forming apparatus 100, the CPU 600 receives the print/copy signal S0 (time T0). When receiving the print/copy signal S0, the CPU 600 starts to increase the temperature of the fixing device 3 and drive the motor 41 via the motor drive portion 202. The motor drive portion 202 increases the rotation speed of the motor 41 in accordance with an acceleration signal ACC received from the CPU 600. When the rotation speed of the motor 41 reaches the preliminary rotation speed (first speed) Vp (time T1), the CPU 600 maintains the rotation speed of the motor 41 at the preliminary rotation speed Vp. Here, for the purpose of silencing of the image forming apparatus 100, the rotation speed of the motor 41 is inhibited from being increased up to the main rotation speed (second speed) Vm, which is a rotation speed for optical writing, without stopping. The main rotation speed (second speed) Vm is higher than the preliminary rotation speed (first speed) Vp. Even when the CPU 600 receives the print/copy signal S0, the image forming apparatus 100 cannot immediately start the image formation, and enters a state of standing by until the temperature of the fixing device 3 rises up to a temperature that allows the image formation. However, from the viewpoint of shortening the first copy output time, the sheet P subjected to the image formation needs to be output in a shortest time period after the increasing of the temperature of the fixing device 3 is completed, and hence the rotation speed of the motor 41 needs to be increased up to the preliminary rotation speed Vp. The preliminary rotation speed Vp can be lowered to a rotation speed that causes no noise uncomfortable for the user as long as the first copy output time is not subjected to a delay.

At a stage (time T1) when the rotation speed of the motor 41 has converged on the preliminary rotation speed Vp, the CPU 600 executes a reflection surface candidate identification sequence SR1 for the rotary polygon mirror 42. The reflection surface candidate identification sequence SR1 is executed before the rotation of the photosensitive member 50 is started. In other words, the reflection surface candidate identification sequence SR1 is executed before the charging bias is applied to the charging roller 12 and before the developing bias is applied to the developing roller 94. In the reflection surface candidate identification sequence SR1, the light source 17 emits the light beam across an entire width of the photosensitive member 50 while maintaining a light-emitting state while the rotary polygon mirror 42 rotates one revolution. When the light beam enters the BD 97, the BD 97 outputs the BD signal to the CPU 600. The CPU 600 obtains four count values from the BD signal to the FG signal corresponding to the four reflection surfaces based on the BD signal received from the BD 97 and the FG signal received from the FG 207. The CPU 600 identifies the reflection surfaces A, B, C, and D based on the obtained four count values and the magnitude relation in the count value stored in advance in the ROM 601, and stores the reflection surface candidate identification information in the RAM (storage device) 602. The CPU 600 causes the second counter 604 to continue the count of the FG signal in order to maintain the reflection surface candidate identification information indicating the relationship between the FG signal and the reflection surfaces A, B, C, and D.

In FIG. 1, when the temperature of the fixing device 3 reaches a photosensitive member rotation allowable temperature $T_A$ (time T2), the CPU 600 starts to operate the image forming portion 10 of the image forming apparatus 100. In other words, the CPU 600 outputs the acceleration signal ACC to the motor drive portion 202 of the light scanning apparatus 40, and accelerates the rotation speed of the motor 41 from the preliminary rotation speed Vp to the main rotation speed Vm. At the same time, the CPU 600 starts to rotate the photosensitive member 50 and the developing roller 94 of the developing device 13 for an image forming operation.

When the rotation speed of the photosensitive member 50 reaches a predetermined rotation speed Vd for image formation, the CPU 600 starts to apply the charging bias to the charging roller 12. Further, when the rotation speed of the developing roller 94 reaches a predetermined rotation speed Vr for image formation, the CPU 600 starts to apply the developing bias to the developing roller 94. The marking back occurs if the light beam is emitted to an image formation area of the photosensitive member 50 after the charging bias and the developing bias are applied, and hence the light source 17 is controlled in a BD area light emission search sequence SR2 described later so as to prevent the light beam from being emitted to the image formation area.

When the rotation speed of the motor 41 reaches the main rotation speed Vm (time T3), the CPU 600 executes the BD area light emission search sequence SR2. In the BD area light emission search sequence SR2, the CPU 600 inhibits the light source 17 from continuing the light-emitting state while the rotary polygon mirror 42 rotates one revolution. The marking back occurs if the image formation area of the photosensitive member 50 is exposed to the light beam, and hence only the BD 97 and a vicinity thereof are reliably exposed without exposing at least the image formation area. The CPU 600 controls the lighting-up timing of the light source 17 based on the reflection surface candidate identification information, the count number of the FG signal, and the time periods ΔtE, ΔtF, ΔtG, and ΔtH stored in the ROM 601. When the light emitting timing of the light beam for causing the BD 97 to output the BD signal is successfully acquired, the BD area light emission search sequence SR2 is brought to an end (time T4).

Subsequently, the light beam modulated based on the image information is emitted to the image formation area of the photosensitive drum 50, and the electrostatic latent image is formed to conduct the image forming operation.

(Flowchart of CPU)

Figure 9A:
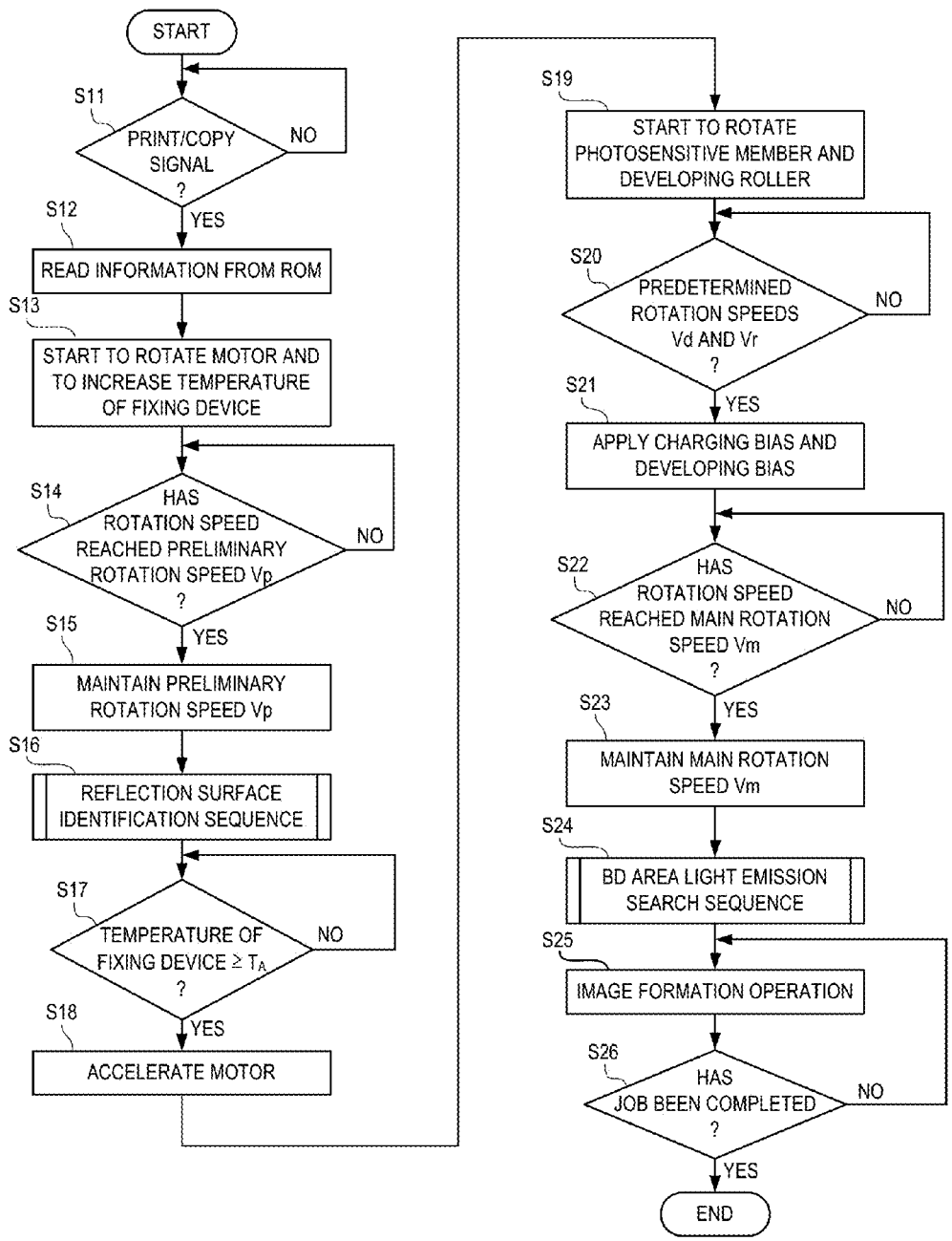
FIG. 9A is a flowchart illustrating a control sequence of a CPU according to the first embodiment.
Figure 9B:
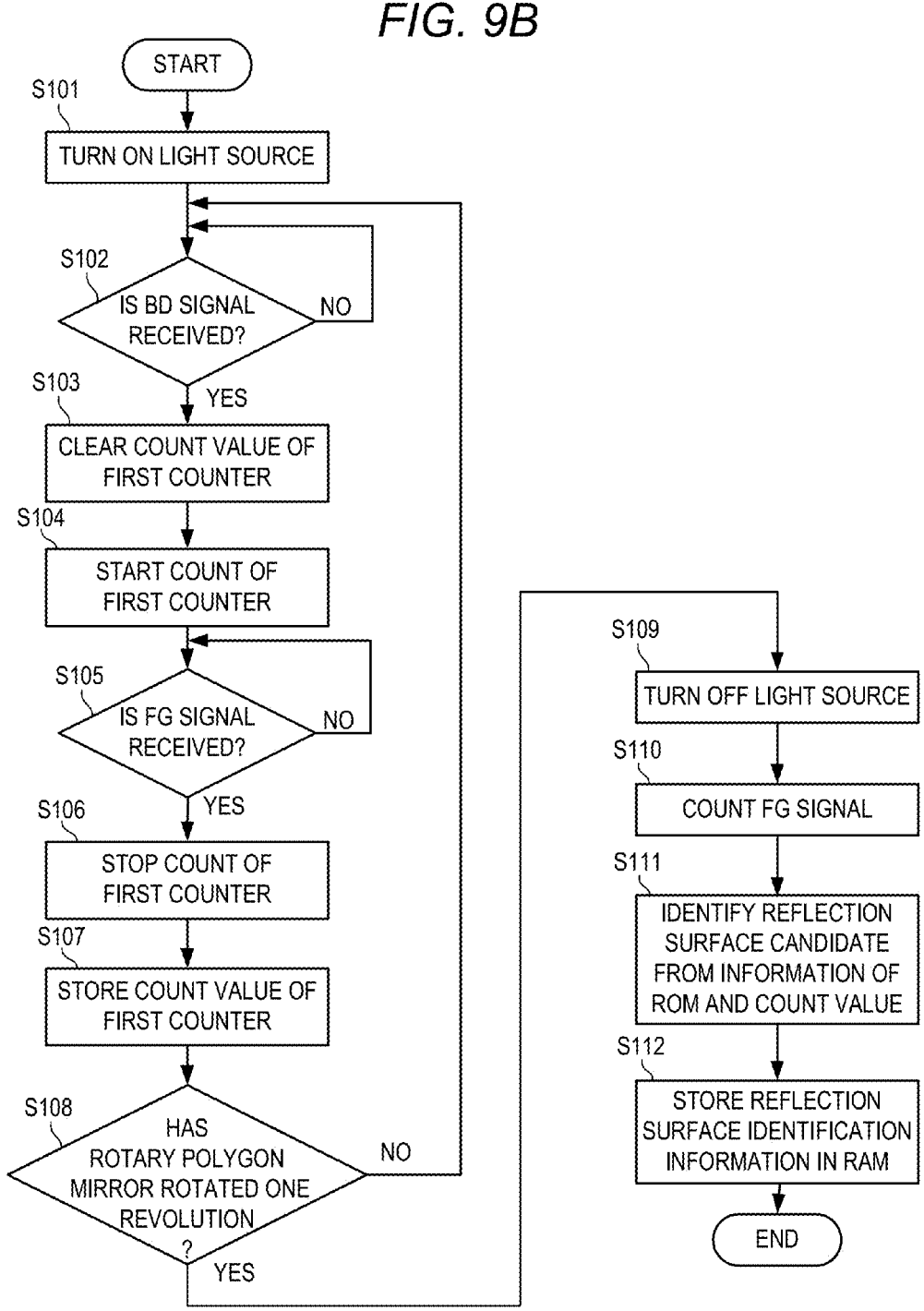
FIG. 9B is a flowchart of a reflection surface candidate identification sequence.

Next, with reference to FIGS. 9A, 9B, and 9C, the control sequence of the CPU 600 for executing the BD search according to the embodiment will be described in detail. FIG. 9A is a flowchart illustrating the control sequence of the CPU 600 according to the first embodiment. The control program is stored in the ROM 601. The CPU 600 reads the control program from the ROM 601, and executes processing illustrated in the flowchart of FIG. 9A based on the control program.

The CPU 600 determines whether or not the print/copy signal S0 has been received (S11). When the print/copy signal S0 is received (YES in Step S11), the CPU 600 reads information from the ROM 601 (S12). The information includes the magnitude relation in the count value (time period) corresponding to one revolution of the rotary polygon mirror 42. In the embodiment, the magnitude relation in the count value corresponding to one revolution is the magnitude relation ($\Delta tA > \Delta tB > \Delta tC > \Delta tD$) among the count values $\Delta tA$, $\Delta tB$, $\Delta tC$, and $\Delta tD$ from the BD signal to the FG signal regarding the four reflection surfaces A, B, C, and D.

Note that, the magnitude relation in the count value corresponding to one revolution of the rotary polygon mirror 42 is measured in advance in a manufacturing process, and the measurement result is stored in the ROM 601. The magnitude relation read from the ROM 601 is stored in the RAM 602.

The CPU 600 starts to rotate the motor 41 and to increase the temperature of the fixing device 3 (S13). The CPU 600 determines whether or not the rotation speed of the motor 41 has reached the preliminary rotation speed Vp (S14). When the rotation speed of the motor 41 reaches the preliminary rotation speed Vp (YES in Step S14), the CPU 600 maintains the rotation speed of the motor 41 at the preliminary rotation speed Vp (S15).

The CPU 600 executes the reflection surface candidate identification sequence SR1 (S16). The reflection surface candidate identification sequence SR1 will be described later with reference to a flowchart of FIG. 9B.

The CPU 600 determines whether or not the temperature of the fixing device 3 is equal to or higher than the photosensitive member rotation allowable temperature $T_A$ (S17). When the temperature of the fixing device 3 is equal to or higher than the photosensitive member rotation allowable temperature $T_A$ (YES in Step S17), the CPU 600 accelerates the motor 41 (S18). At the same time, the CPU 600 starts to rotate the photosensitive member 50 and the developing roller 94 (S19). The CPU 600 determines whether or not the rotation speeds of the photosensitive member 50 and the developing roller 94 have converged on the predetermined rotation speeds Vd and Vr, respectively (S20). When the rotation speeds of the photosensitive member 50 and the developing roller 94 have converged on the predetermined rotation speeds Vd and Vr, respectively (YES in Step S20), the CPU 600 applies the charging bias to the charging roller 12, and applies the developing bias to the developing roller 94 (S21).

The CPU 600 determines whether or not the rotation speed of the motor 41 has reached the main rotation speed Vm (S22). When the rotation speed of the motor 41 reaches the main rotation speed Vm (YES in Step S22), the CPU 600 maintains the rotation speed of the motor 41 at the main rotation speed Vm (S23).

The CPU 600 executes the BD area light emission search sequence SR2 (S24). The BD area light emission search sequence SR2 will be described later with reference to a flowchart of FIG. 9C.

The CPU 600 executes the image forming operation (S25). When the job has been completed (YES in Step S26), the CPU 600 brings the control sequence to an end.

(Reflection Surface Candidate Identification Sequence SR1)

Next, with reference to FIG. 9B, the reflection surface candidate identification sequence SR1 conducted in Step S16 will be described in detail.

In the state in which the rotary polygon mirror 42 is stably rotated at the preliminary rotation speed Vp, the CPU 600 controls the light source drive portion 607 to turn on the light source 17 to emit the light beam (S101). The light source 17 continuously emits the light beam during at least one revolution of the rotary polygon mirror 42. The light beam emitted from the light source 17 is reflected by the reflection surface of the rotary polygon mirror 42 to scan the surface of the photosensitive member 50, and enters the BD 97. As illustrated in FIG. 1, in the reflection surface candidate identification sequence SR1, the photosensitive member 50 or the developing roller 94 is not being rotated. Further, the charging bias or the developing bias is not being applied to the charging roller 12 or the developing roller 94. Therefore, the electrostatic latent image on the photosensitive member 50 is not to be developed.

The BD signal output from the BD 97 is input to the CPU 600. As illustrated in FIG. 1, the BD signal output in this case is generated during the segment of the reflection surface candidate identification sequence SR1. The CPU 600 determines whether or not the BD signal has been received (S102). When the BD signal has been received (YES in Step S102), the count value of the first counter 603 is cleared to 0 (S103), and the first counter 603 is caused to start the count of the time period (S104).

The FG signal output from the FG is input to the CPU 600. The CPU 600 determines whether or not the FG signal has been received (S105). When the FG signal has been received (YES in Step S105), the CPU 600 stops the count of the time period conducted by the first counter 603 (S106). The first counter 603 outputs the time period counted from the BD signal to the FG signal to the CPU 600. In the embodiment, the first counter 603 counts a time period from a fall of the BD signal to a rise of the FG signal. However, a time period from the fall of the BD signal to a fall of the FG signal may be counted. Further, a time period from a rise of the BD signal to the rise or the fall of the FG signal may be counted. Further, in the embodiment, the time period from the BD signal to the FG signal is counted, but the present invention is not limited thereto. The time period from the FG signal to the BD signal may be counted.

The CPU 600 stores the time period from the BD signal to the FG signal counted by the first counter 603 in the RAM 602 as the count value $\Delta t1$ (S107). The CPU 600 determines whether or not the rotary polygon mirror 42 has rotated one revolution (S108). It may be determined whether or not the rotary polygon mirror 42 has rotated one revolution based on whether or not the number of BD signals output from the BD 97 has reached the number of reflection surfaces of the rotary polygon mirror 42. In the embodiment, the number of reflection surfaces of the rotary polygon mirror 42 is four, and hence it is determined whether or not the BD signal has been received four times. The CPU 600 returns to Step S102 when determining that the rotary polygon mirror 42 has not rotated one revolution (NO in Step S108).

The CPU 600 repeats Step S102 to Step S108 a number of times corresponding to the number of reflection surfaces of the rotary polygon mirror 42, to thereby obtain the count values $\Delta t1$, $\Delta t2$, $\Delta t3$, and $\Delta t4$. In Step S108, when determining that the rotary polygon mirror 42 has rotated one revolution (YES in Step S108), the CPU 600 controls the light source drive portion 607 to turn off the light source 17 (S109). In the embodiment, the rotary polygon mirror 42 includes the four reflection surfaces, and hence the light source 17 is turned off after the BD signal has occurred from the BD 97 four times.

The FG signal output from the FG 207 is also input to the second counter 604. The CPU 600 causes the second counter 604 to count the FG signal (S110). Subsequently, the CPU 600 identifies the reflection surface candidate of the rotary polygon mirror 42 from the information on the magnitude relation in the count value regarding the four reflection surfaces of the rotary polygon mirror 42 read from the ROM 601 in Step S12 of FIG. 9A and the four count values stored in the RAM 602 in Step S107 (S111). In other words, the reflection surfaces A, B, C, and D of the rotary polygon mirror 42 are identified from the magnitude relation among the count values $\Delta t1$, $\Delta t2$, $\Delta t3$, and $\Delta t4$ and the magnitude relation $\Delta tA > \Delta tB > \Delta tC > \Delta tD$ read from the ROM 601. For example, assuming that $\Delta t3$ is largest of the count values $\Delta t1$, $\Delta t2$, $\Delta t3$, and $\Delta t4$, $\Delta t3$ corresponds to the reflection surface A.

Because the light source 17 is turned off, the BD signal is not output. Accordingly, it is not possible to maintain a relationship between the identified reflection surfaces A, B, C, and D and the BD signal. However, in the embodiment, the second counter 604 continues the count of the FG signal. In the embodiment, five FG signals are output during one revolution of the rotary polygon mirror 42. Therefore, by continuing the count of the FG signal, it is possible to maintain the relationship between the identified reflection surfaces A, B, C, and D and the FG signal. The CPU 600 stores the relationship (reflection surface candidate identification information) between the count number of the FG signal obtained by the second counter 604 and the reflection surfaces A, B, C, and D in the RAM 602 (S112).

The reflection surface candidate identification sequence SR1 for identifying the reflection surfaces A, B, C, and D of the rotary polygon mirror 42 is executed before the charging bias is applied to the charging roller 12 and before the developing bias is applied to the developing roller 94. The marking back occurs on the sheet P if, as in the related art, the charging bias is applied to the charging roller 12, the developing bias is applied to the developing roller 94, and the light source 17 is turned on while the photosensitive member 50 is rotated. In contrast, in the embodiment, the light source 17 is turned on before the charging bias and the developing bias are applied, to thereby obtain the relationship between the reflection surfaces A, B, C, and D of the rotary polygon mirror 42 and the FG signal. This prevents the marking back from occurring on the sheet P.

(BD Area Light Emission Search Sequence)

Next, with reference to FIG. 9C, the BD area light emission search sequence SR2 conducted in Step S24 will be described in detail. The BD area light emission search sequence SR2 is executed after the rotation of the photosensitive member 50 and the developing roller 94 is started (S19) and the charging bias and the developing bias are applied to the charging roller 12 and the developing roller 94, respectively (S21). Accordingly, in the BD area light emission search sequence SR2, the marking back occurs if the image formation area of the photosensitive member 50 is exposed to the light beam. Therefore, in the BD area light emission search sequence SR2, it is necessary to emit the light beam to an area including the BD 97 except for the image formation area without exposing the image formation area, so as to output the BD signal from the BD 97.

In the state in which the motor 41 is stably rotated at the main rotation speed Vm for optical writing, the CPU 600 reads the information from the ROM 601 (S201) and simultaneously reads the information from the RAM 602 (S202). The information read from the ROM 601 includes the time periods $\Delta tE$, $\Delta tF$, $\Delta tG$, and $\Delta tH$ each from the FG signal within the period corresponding to the reflection surface to the BD signal for the subsequent reflection surface at the main rotation speed Vm. The information read from the RAM 602 is the relationship (reflection surface candidate identification information) between the count number of the FG signal obtained by the second counter 604 and the reflection surfaces A, B, C, and D.

The CPU 600 calculates an area (hereinafter referred to as "BD area") that can generate the BD signal from the time periods $\Delta tE$, $\Delta tF$, $\Delta tG$, and $\Delta tH$ and the reflection surface candidate identification information (S203). The BD area is a period during which the light source 17 is kept on in order to accurately obtain the timing to generate the BD signal by the BD 97. The BD area is an area in which the image formation area of the photosensitive member 50 is not exposed to the light beam emitted from the light source 17. For example, in regard to the reflection surface A, the BD signal is to be output after the time period $\Delta tE$ has elapsed since the FG signal within the period corresponding to the reflection surface A (FIG. 8B). However, a margin $\beta$ is used in order to reliably output the BD signal to the BD 97 without exposing the image formation area of the photosensitive member 50. Specifically, the light source 17 starts to be turned on after a time period $\Delta tE - \beta$ has elapsed since the FG signal within the period corresponding to the reflection surface A. Accordingly, in Step S203, specifically, the CPU 600 calculates the time periods $\Delta tE - \beta$, $\Delta tF - \beta$, $\Delta tG - \beta$, and $\Delta tH - \beta$ for the reflection surfaces A, B, C, and D, respectively.

The CPU 600 identifies the reflection surface A based on the count number of the FG signal obtained by the second counter 604 and the reflection surface candidate identification information. Then, the light source 17 is turned on after the time period $\Delta tE - \beta$ has elapsed since the FG signal within the period corresponding to the reflection surface A (S204).

The CPU 600 determines whether or not the BD signal has been received from the BD 97 (S205). When the BD signal has not been received (No in Step S205), the CPU 600 keeps the light source 17 to be turned on until the BD signal is received. When the BD signal is received (YES in Step S205), the CPU 600 turns off the light source 17 (S206). The CPU 600 obtains a time period $\Delta tE1$ from the FG signal within the period corresponding to the reflection surface A until the BD signal for the reflection surface B is received. This allows the lighting-up timing for turning on the light source 17 to be determined in order to output the BD signal for the reflection surface B. The CPU 600 stores the lighting-up timing for the reflection surface B in the RAM 602 (S207). Alternatively, the CPU 600 may determine the lighting-up timing of the light source 17 by counting a time period between the BD signal and the BD signal. In that case, the time period between the BD signal and the BD signal is stored in the RAM 602.

The CPU 600 counts the BD signal (S208). The CPU 600 determines whether or not the rotary polygon mirror 42 has rotated one revolution (S209). It may be determined whether or not the rotary polygon mirror 42 has rotated one revolution based on whether or not the count number of the BD signal has reached the same number as the number of reflection surfaces of the rotary polygon mirror 42. In the embodiment, the number of reflection surfaces of the rotary polygon mirror 42 is four, and hence it is determined whether or not the count number of the BD signal has become equal to or larger than 4. When the count number of the BD signal is less than 4 (No in Step S209), the procedure returns to Step S204. The CPU 600 repeats Steps S204 to S209 a number of times corresponding to the number of reflection surfaces of the rotary polygon mirror 42, to thereby determine the lighting-up timing for turning on the light source 17 in order to output the BD signal for the reflection surface C, the reflection surface D, and the reflection surface A. The CPU 600 stores the lighting-up timing for the reflection surface C, the reflection surface D, and the reflection surface A in the RAM 602 (S207).

When the count number of the BD signal is equal to or larger than 4 (YES in Step S209), the CPU 600 determines that the BD signal has been periodically captured correctly, to thereby bring the BD area light emission search sequence SR2 to an end.

According to the embodiment, the light beam for identifying the reflection surface candidate of the rotary polygon mirror 42 is emitted before a bias (voltage) is applied to a process member such as the charging roller 12 or the developing roller 94. Further, after the bias is applied to the process member, it is possible to obtain a more accurate lighting-up timing of the BD signal by turning on the light source 17 at the lighting-up timing at which the image formation area of the photosensitive member 50 is not exposed to the light beam. This prevents the marking back from occurring on the sheet P. Further, it is not necessary to constantly emit the light beam for outputting the BD signal during the rotation of the motor 41, which is advantageous from the viewpoint of increasing the life of the light source 17.

Second Embodiment

In the first embodiment, from the viewpoint of silencing the motor 41, the motor 41 is activated in two stages at the preliminary rotation speed Vp and the main rotation speed Vm. However, the present invention is not limited thereto. In other words, the present invention can be applied to a case of accelerating the motor 41 to the main rotation speed Vm for the time of image formation in one stage. Now, a second embodiment in which the motor 41 is activated in one stage at the main rotation speed Vm will be described.

In the second embodiment, the same components as those of the first embodiment are denoted by the same reference symbols, and descriptions thereof are omitted. An image forming apparatus and a light scanning apparatus according to the second embodiment are the same as those of the first embodiment, and hence descriptions thereof are omitted. Points different from those of the first embodiment will be described below.

Figure 10:
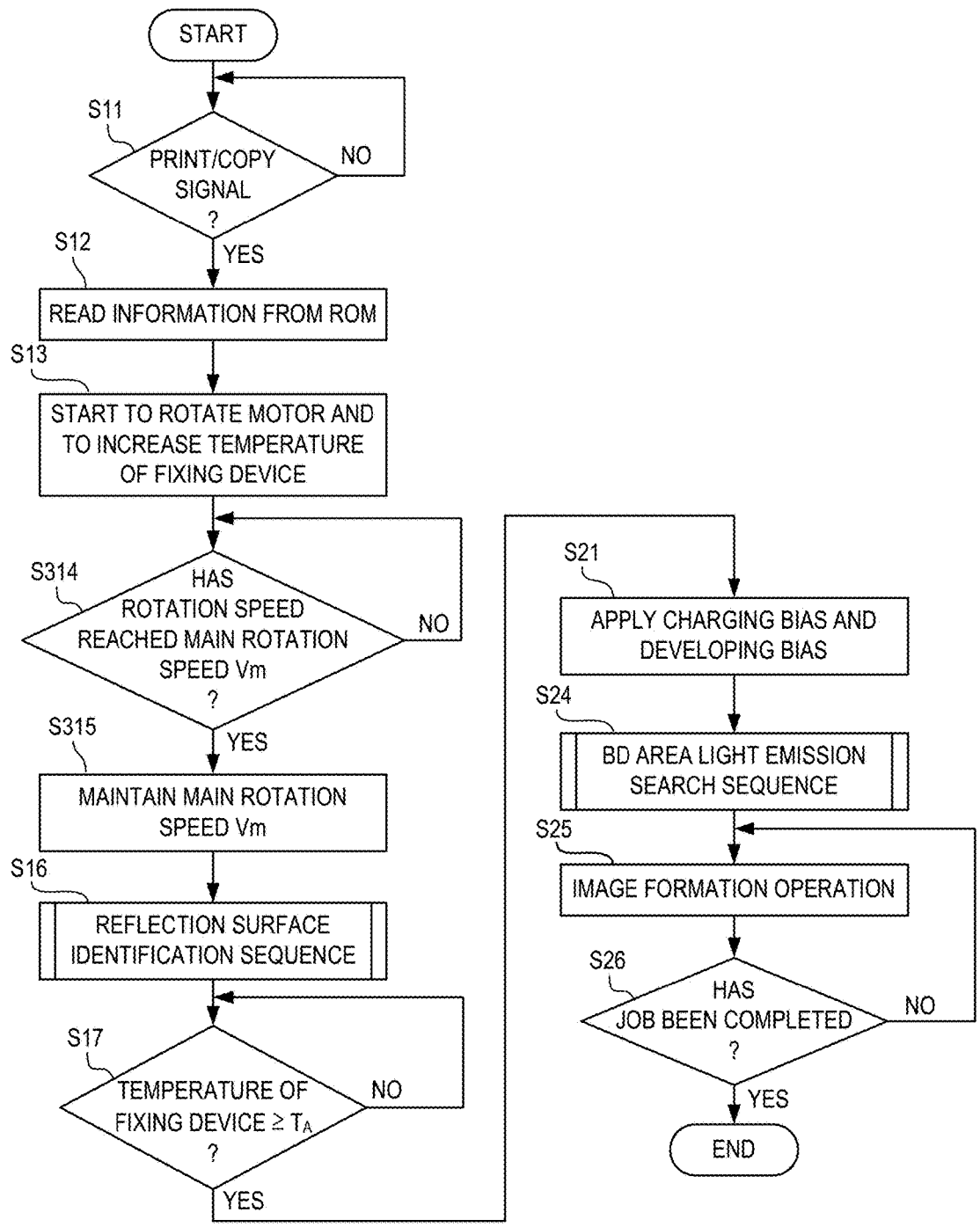
FIG. 10 is a flowchart illustrating a control sequence of a CPU according to a second embodiment.

FIG. 10 is a flowchart illustrating the control sequence of the CPU 600 according to the second embodiment. The same steps as those of the flowchart of the first embodiment illustrated in FIG. 9A are denoted by the same reference symbols, and descriptions thereof are omitted. After starting to rotate the motor 41 and to increase the temperature of the fixing device 3 (S13), the CPU 600 accelerates the motor 14 up to the main rotation speed Vm without stopping. The CPU 600 determines whether or not the rotation speed of the motor 41 has reached the main rotation speed Vm (S314). When the rotation speed of the motor 41 reaches the main rotation speed Vm (YES in Step S314), the CPU 600 maintains the rotation speed of the motor 41 at the main rotation speed Vm (S315).

In the state in which the motor 41 is stably rotated at the main rotation speed Vm, the CPU 600 carries out the reflection surface candidate identification sequence SR1 before the charging bias is applied to the charging roller 12 and before the developing bias is applied to the developing roller 94 (S16). After the reflection surface candidate identification sequence SR1, the light source 17 is turned off. The CPU 600 determines whether or not the temperature of the fixing device 3 is equal to or higher than the photosensitive member rotation allowable temperature $T_A$ (S17). When the temperature of the fixing device 3 is equal to or higher than the photosensitive member rotation allowable temperature $T_A$ (YES in Step S17), the CPU 600 applies the charging bias to the charging roller 12, and applies the developing device to the developing roller 94 (S21).

After the charging bias and the developing bias start to be applied, the CPU 600 carries out the BD area light emission search sequence SR2. In the BD area light emission search sequence SR2, only the vicinity of the BD 97 area is reliably exposed to output the BD signal, and prepares for the writing for the image formation.

In this manner, even when the motor 41 is activated in one stage at the main rotation speed Vm, the present invention can be applied. The second embodiment can produce the same effects as the first embodiment.

Third Embodiment

In the first embodiment, the number of pulses of the FG signal generated while the rotary polygon mirror 42 rotates one revolution is 5, and the number of pulses of the BD signal is 4 (because the rotary polygon mirror 42 includes 4 surfaces). However, the present invention is not limited thereto. The number of pulses of the FG signal per revolution of the rotary polygon mirror 42 may be not only 5 but also 3, 6, 7, or equal to or larger than 8. Further, the number of pulses of the BD signal per revolution of the rotary polygon mirror 42 may be not only 4 but also 3, 5, 6, or equal to or larger than 7. For example, in a third embodiment, a case where the number of pulses of the BD signal per revolution of the rotary polygon mirror 42 is set to 4 and the number of pulses of the FG signal is set to 6 will be described.

In the third embodiment, the same components as those of the first embodiment are denoted by the same reference symbols, and descriptions thereof are omitted. An image forming apparatus and a light scanning apparatus according to the third embodiment are the same as those of the first embodiment, and hence descriptions thereof are omitted. Points different from those of the first embodiment will be described below.

FIG. 11A is a timing chart illustrating a relationship between the BD signal and the FG signal at the preliminary rotation speed Vp according to the third embodiment. As illustrated in FIG. 11A, in a state in which the motor 41 is rotated at the preliminary rotation speed Vp, the count values ΔtA, ΔtB, ΔtC, and ΔtD have the following relationship.

$$\Delta tA \approx \Delta tC > \Delta tB \approx \Delta tD$$

Then, as described above, the magnitude relation among the time periods from the BD signal to the FG signal regarding the respective reflection surfaces of the rotary polygon mirror 42 is stored in advance in the ROM 601. The four count values obtained from the first counter 603 are compared with the magnitude relation stored in the ROM 601, to thereby identify the reflection surface candidate. In the example of FIG. 11A, the reflection surfaces A, B, C, and D of the rotary polygon mirror 42 cannot be strictly identified, but it is possible to identify the reflection surface candidates, such as the reflection surface A or the reflection surface C and the reflection surface B or the reflection surface D, on which the light beam for obtaining the BD signal is to be made incident.

FIG. 11B is a timing chart illustrating a relationship between the BD signal and the FG signal at the main rotation speed Vm according to the third embodiment. As illustrated in FIG. 11B, the time period $\Delta tE$ is the time period from the FG signal within the period corresponding to the reflection surface A to the BD signal for the reflection surface B. The time period $\Delta tF$ is the time period from the FG signal (in the embodiment, first FG signal) within the period corresponding to the reflection surface B to the BD signal for the reflection surface C. The time period $\Delta tG$ is the time period from the FG signal within the period corresponding to the reflection surface C to the BD signal for the reflection surface D. The time period $\Delta tH$ is the time period from the FG signal (in the embodiment, first FG signal) within the period corresponding to the reflection surface D to the BD signal for the reflection surface A.

Figure 9C:
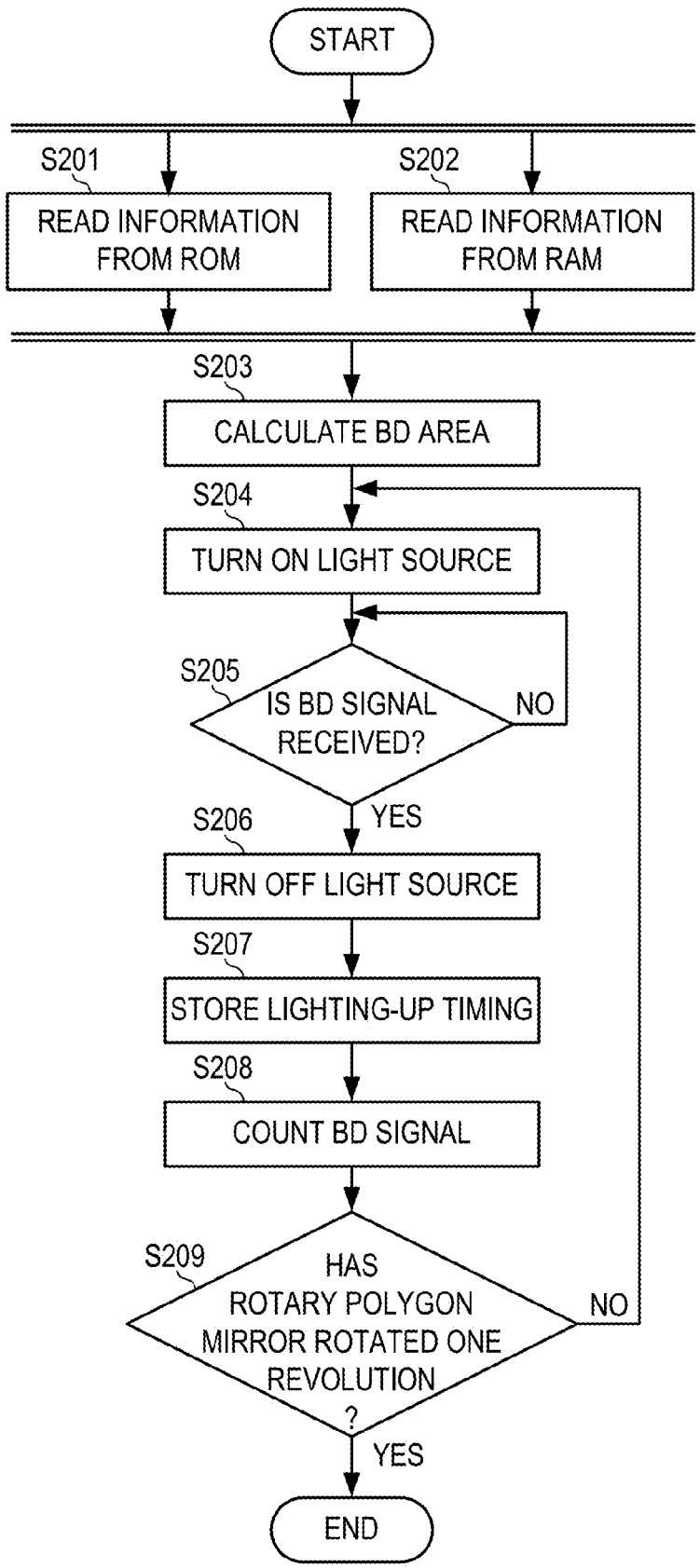
FIG. 9C is a flowchart of a BD area light emission search sequence.

In the BD area light emission search sequence SR2 illustrated in FIG. 9C, the margin $\beta$ is used in order to reliably output the BD signal to the BD 97 without exposing the image formation area of the photosensitive member 50. Specifically, the light source 17 starts to be turned on after the time period $\Delta tE-\beta$ has elapsed since the FG signal within the period corresponding to the reflection surface A. In Step S203, specifically, the CPU 600 calculates the time periods $\Delta tE-\beta$, $\Delta tF-\beta$, $\Delta tG-\beta$, and $\Delta tH-\beta$ for the reflection surfaces A, B, C, and D, respectively.

Here, $\Delta tE-\beta \approx \Delta tG-\beta$ $\Delta tF-\beta \approx \Delta tH-\beta$ The reflection surfaces A, B, C, and D of the rotary polygon mirror 42 cannot be strictly identified. However, it is possible to identify which of the reflection surface A or the reflection surface C and the reflection surface B or the reflection surface D the reflection surface to be identified (reflection surface candidate) is. Then, the light source 17 is turned on after the time period $\Delta tE-\beta$ has elapsed since the FG signal within the period corresponding to the reflection surface A or the reflection surface C. The light source 17 is kept turned on until the BD signal is received, and when the BD signal is received, the CPU 600 turns off the light source 17. The CPU 600 obtains the time period $\Delta tE1$ from the FG signal within the period corresponding to the reflection surface A or the reflection surface C until the BD signal for the reflection surface B or the reflection surface D is received. Further, the light source 17 is turned on after the time period $\Delta tF-\beta$ has elapsed since the first FG signal within the period corresponding to the reflection surface B or the reflection surface D. The light source 17 is kept turned on until the BD signal is received, and when the BD signal is received, the CPU 600 turns off the light source 17. The CPU 600 obtains a time period $\Delta tF1$ from the FG signal within the period corresponding to the reflection surface B or the reflection surface D until the BD signal for the reflection surface C or the reflection surface A is received. In this manner, the lighting-up timing to turn on the light source 17 can be determined in order to output the BD signal for the reflection surfaces A, B, C, and D. Note that, instead of the time periods $\Delta tE1$ and $\Delta tF1$, the lighting-up timing to turn on the light source 17 may be determined by obtaining the time period between the BD signal and the BD signal.

The light beam emitted from the light source 17 can expose only the vicinity of the BD 97 area. Therefore, the marking back can be prevented from occurring on the sheet P by employing the BD area light emission search sequence SR2 of FIG. 9C. The third embodiment can produce the same effects as the first embodiment.

As described above, the emission of the light beam for identifying the reflection surface candidate of the rotary polygon mirror is conducted before the application of the charging bias or the developing bias, and hence the marking back does not occur on the sheet P. Further, the number of outputs of the FG signal keeps being counted even after the reflection surface candidate of the rotary polygon mirror 42 is identified, and hence it is possible to keep identifying the reflection surface candidate of the rotary polygon mirror 42 without emitting the light beam. Then, the lighting-up timing of the light source 17 to emit the light beam for generating the BD signal can be determined by using the reflection surface candidate identification information and the time period from the FG signal for the reflection surface candidate stored in the ROM 601 up to the BD signal for the reflection surface subsequent to the reflection surface candidate. Accordingly, the light source 17 can emit the light beam for generating the BD signal without emitting the light beam to the image formation area of the photosensitive member 50. Therefore, in the BD area light emission search sequence SR2, even when the bias (voltage) is applied to the process member such as the charging roller 12 or the developing roller 94, the marking back is not caused to occur on the sheet P.

According to the above-mentioned embodiments, it is possible to determine the lighting-up timing of the light source for obtaining the synchronizing signal with a simple structure without causing the marking back to occur on the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083559, filed Apr. 15, 2014 which is hereby incorporated by reference herein in its entirety.

REFERENCE SIGNS LIST

12 . . . charging roller (process member)
17 . . . light source
40 . . . light scanning apparatus
42 . . . rotary polygon mirror
50 . . . photosensitive member
94 . . . developing roller (process member)
97 . . . BD (first signal generating unit)
100 . . . image forming apparatus
207 . . . FG (second signal generating unit)
A, B, C, D . . . reflection surface
L . . . light beam

The invention claimed is:

1. An image forming apparatus, comprising:
a plurality of photosensitive members;
a plurality of charging devices provided corresponding to the plurality of photosensitive members, respectively, and configured to charge the plurality of photosensitive members, respectively;
a plurality of developing devices provided corresponding to the plurality of photosensitive members, respectively, and configured to develop electrostatic latent images, formed on the plurality of photosensitive members, respectively, by using respective toners;
a transfer device including: an intermediate transfer belt onto which toner images formed on the plurality of photosensitive members are transferred; a plurality of rollers configured to rotate the intermediate transfer belt, and a transfer roller configured to form a transfer nip between the transfer roller and one of the plurality of rollers and to which a transfer bias is applied, wherein the toner images on the intermediate transfer belt are transferred onto a recording material at the transfer nip;
a light scanning apparatus configured to emit a plurality of light beams to form the electrostatic latent images on the plurality of photosensitive members, respectively,
wherein as an exposure unit for one of the plurality of photosensitive members, the light scanning apparatus comprises:
a light source configured to emit a light beam;
a rotary polygon mirror comprising a plurality of reflection surfaces configured to deflect the light beam emitted from the light source so that the light beam scans the one of the plurality of photosensitive members;
a drive motor which rotates the rotary polygon mirror, the drive motor including a rotary rotor to which the rotary polygon mirror and a magnet are fixed, wherein N poles and S poles of the magnet are alternately magnetized along a rotation direction of the rotary polygon mirror;
a beam detector configured to receive the light beam deflected by each of the plurality of reflection surfaces, and to generate a first signal indicating a scan starting position of the light beam on the one of the plurality of photosensitive members based on each reception of the light beam deflected by each of the plurality of reflection surfaces; and
a rotation sensor which generates a second signal in accordance with a rotation phase of the rotor in response to a rotation of the magnet in association with a rotation of the rotor,
wherein the image forming apparatus further comprises a controller which, until one of the plurality of charging devices starts charging the one of the plurality of photosensitive members for forming an image based on image data after a start signal for starting image formation is inputted, causes the rotor to rotate and causes the light source to emit the light beam continuously during at least one revolution of the rotary polygon mirror so as to cause the beam detector to generate the first signal and so as to cause the rotation sensor to generate the second signal,
the controller identifying, based on a phase relationship between the first signal and the second signal, a scan timing at which the light beam scans the beam detector during one revolution of rotation of the rotary polygon mirror,
the controller controlling, after the one of the plurality of charging devices starts charging the one of the plurality of photosensitive members, an emission timing of the light beam based on the scan timing so that the light beam scans the beam detector to generate the first signal without scanning the one of the plurality of photosensitive members,
wherein the phase relationship between the first signal and the second signal is obtained in a state in which the rotary polygon mirror is rotated at a first speed without applying the voltage to the one of the plurality of charging devices, and
wherein the emission timing of the light source is determined based on the phase relationship between the first signal and the second signal and a number of second signals in a state in which the rotary polygon mirror is rotated at a second speed higher than the first speed with the voltage being applied to the one of the plurality of charging devices.

2. An image forming apparatus according to claim 1, further comprising a storage unit configured to store an interval of time between the first signal and the second signal for each of the plurality of reflection surfaces of the rotary polygon mirror in a state in which the rotary polygon mirror is rotated at the second speed.

3. An image forming apparatus, comprising:
a plurality of photosensitive members;
a plurality of charging devices provided corresponding to the plurality of photosensitive members, respectively, and configured to charge the plurality of photosensitive members, respectively;
a plurality of developing devices provided corresponding to the plurality of photosensitive members, respectively, and configured to develop electrostatic latent images, formed on the plurality of photosensitive members, respectively, by using respective toners;
a transfer device including: an intermediate transfer belt onto which toner images formed on the plurality of photosensitive members are transferred; a plurality of rollers configured to rotate the intermediate transfer belt, and a transfer roller configured to form a transfer nip between the transfer roller and one of the plurality of rollers and to which a transfer bias is applied, wherein the toner images on the intermediate transfer belt are transferred onto a recording material at the transfer nip;
a light scanning apparatus configured to emit a plurality of light beams to form the electrostatic latent images on the plurality of photosensitive members, respectively,
wherein as an exposure unit for one of the plurality of photosensitive members, the light scanning apparatus comprises:
a light source configured to emit a light beam;
a rotary polygon mirror comprising a plurality of reflection surfaces configured to deflect the light beam emitted from the light source so that the light beam scans the one of the plurality of photosensitive members;
a drive motor which rotates the rotary polygon mirror, the drive motor including a rotary rotor to which the rotary polygon mirror and a magnet are fixed, wherein N poles and S poles of the magnet are alternately magnetized along a rotation direction of the rotary polygon mirror;
a beam detector configured to receive the light beam deflected by each of the plurality of reflection surfaces, and to generate a first signal indicating a scan starting position of the light beam on the one of the plurality of photosensitive members based on each reception of the light beam deflected by each of the plurality of reflection surfaces; and a rotation sensor which generates a second signal in accordance with a rotation phase of the rotor in response to a rotation of the magnet in association with a rotation of the rotor, wherein the image forming apparatus further comprises a controller which, until one of the plurality of charging devices starts charging the one of the plurality of photosensitive members for forming an image based on image data after a start signal for starting image formation is inputted, causes the rotor to rotate and causes the light source to emit the light beam continuously during at least one revolution of the rotary polygon mirror so as to cause the beam detector to generate the first signal and so as to cause the rotation sensor to generate the second signal, the controller identifying, based on a phase relationship between the first signal and the second signal, a scan timing at which the light beam scans the beam detector during one revolution of rotation of the rotary polygon mirror, the controller controlling, after the one of the plurality of charging devices starts charging the one of the plurality of photosensitive members, an emission timing of the light beam based on the scan timing so that the light beam scans the beam detector to generate the first signal without scanning the one of the plurality of photosensitive members, wherein the rotation sensor generates a plurality of second signals at the same interval of time while the rotary polygon mirror rotates one revolution.

4. An image forming apparatus, comprising:
a plurality of photosensitive members;
a plurality of charging devices provided corresponding to the plurality of photosensitive members, respectively, and configured to charge the plurality of photosensitive members, respectively;
a plurality of developing devices provided corresponding to the plurality of photosensitive members, respectively, and configured to develop electrostatic latent images, formed on the plurality of photosensitive members, respectively, by using respective toners;
a transfer device including: an intermediate transfer belt onto which toner images formed on the plurality of photosensitive members are transferred; a plurality of rollers configured to rotate the intermediate transfer belt, and a transfer roller configured to form a transfer nip between the transfer roller and one of the plurality of rollers and to which a transfer bias is applied, wherein the toner images on the intermediate transfer belt are transferred onto a recording material at the transfer nip;
a light scanning apparatus configured to emit a plurality of light beams to form the electrostatic latent images on the plurality of photosensitive members, respectively, wherein as an exposure unit for one of the plurality of photosensitive members, the light scanning apparatus comprises:

a light source configured to emit a light beam;
a rotary polygon mirror comprising a plurality of reflection surfaces configured to deflect the light beam emitted from the light source so that the light beam scans the one of the plurality of photosensitive members;
a drive motor which rotates the rotary polygon mirror, the drive motor including a rotary rotor to which the rotary polygon mirror and a magnet are fixed, wherein N poles and S poles of the magnet are alternately magnetized along a rotation direction of the rotary polygon mirror;
a beam detector configured to receive the light beam deflected by each of the plurality of reflection surfaces, and to generate a first signal indicating a scan starting position of the light beam on the one of the plurality of photosensitive members based on each reception of the light beam deflected by each of the plurality of reflection surfaces; and
a rotation sensor which generates a second signal in accordance with a rotation phase of the rotor in response to a rotation of the magnet in association with a rotation of the rotor, wherein the image forming apparatus further comprises a controller which, until one of the plurality of charging devices starts charging the one of the plurality of photosensitive members for forming an image based on image data after a start signal for starting image formation is inputted, causes the rotor to rotate and causes the light source to emit the light beam continuously during at least one revolution of the rotary polygon mirror so as to cause the beam detector to generate the first signal and so as to cause the rotation sensor to generate the second signal, the controller identifying, based on a phase relationship between the first signal and the second signal, a scan timing at which the light beam scans the beam detector during one revolution of rotation of the rotary polygon mirror, the controller controlling, after the one of the plurality of charging devices starts charging the one of the plurality of photosensitive members, an emission timing of the light beam based on the scan timing so that the light beam scans the beam detector to generate the first signal without scanning the one of the plurality of photosensitive members, wherein the first signal comprises a signal indicating an image writing start position of the light beam on the one of the plurality of photosensitive members, and wherein the second signal comprises a signal for detecting a rotation speed of the drive motor configured to rotate the rotary polygon mirror.

* * * * *